US012327340B2

(12) United States Patent
Bindigan Hariprasanna et al.

(10) Patent No.: US 12,327,340 B2
(45) Date of Patent: Jun. 10, 2025

(54) METHOD AND ELECTRONIC DEVICE FOR REMOVING ARTIFACT IN HIGH RESOLUTION IMAGE

(71) Applicant: Samsung Electronics Co., Ltd., Suwon-si (KR)

(72) Inventors: Pawan Prasad Bindigan Hariprasanna, Bengaluru (IN); Saikat Kumar Das, Bengaluru (IN); Green Rosh K S, Bengaluru (IN); Lokesh Rayasandra Boregowda, Bengaluru (IN); Balvinder Singh, Bengaluru (IN); Venkat Ramana Peddigari, Bengaluru (IN); Alok Shankarlal Shukla, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 17/842,309

(22) Filed: Jun. 16, 2022

(65) Prior Publication Data
US 2022/0318961 A1  Oct. 6, 2022

Related U.S. Application Data

(63) Continuation of application No. PCT/KR2022/003239, filed on Mar. 8, 2022.

(30) Foreign Application Priority Data

Mar. 16, 2021 (IN) .............................. 202141011140
Nov. 11, 2021 (IN) .............................. 2021 41011140

(51) Int. Cl.
*G06T 5/20* (2006.01)
*G06T 3/4046* (2024.01)
(Continued)

(52) U.S. Cl.
CPC .............. *G06T 5/80* (2024.01); *G06T 3/4046* (2013.01); *G06T 5/20* (2013.01); *G06V 10/764* (2022.01);
(Continued)

(58) Field of Classification Search
CPC ........... G06T 5/20; G06T 5/80; G06T 3/4046
See application file for complete search history.

(56) References Cited

U.S. PATENT DOCUMENTS 8,107,765 B2   1/2012  Hwang et al.
8,855,195 B1  10/2014  Kelly
(Continued)

FOREIGN PATENT DOCUMENTS

IN   202041039989      3/2022
JP      6553826 B1     7/2019
(Continued)

OTHER PUBLICATIONS

International Search Report and written opinion dated Jun. 17, 2022, issued in International Application No. PCT/KR2022/003239.
(Continued)

*Primary Examiner* — Sam Bhattacharya
(74) *Attorney, Agent, or Firm* — Jefferson IP Law, LLP

(57) ABSTRACT

A method for removing an artifact in a high resolution image by an electronic device is provided. The method includes receiving the high resolution image comprising the artifact. Further, the method includes downscaling the high resolution image into a plurality of lower resolution images. Further, the method includes removing the artifact from the plurality of lower resolution images by applying at least one first machine learning model from a plurality of machine learning models on the plurality of lower resolution images. Further, the method includes generating a high resolution image free from the artifact by applying at least one second (Continued)

machine learning model from the plurality of machine learning models on an output from the at least one first machine learning model. The output from each of the machine learning model comprises a low resolution image free from the artifact.

13 Claims, 47 Drawing Sheets

(51) Int. Cl.
*G06T 5/80* (2024.01)
*G06V 10/764* (2022.01)
*G06V 10/776* (2022.01)

(52) U.S. Cl.
CPC .. *G06V 10/776* (2022.01); *G06T 2207/10016* (2013.01); *G06T 2207/20016* (2013.01); *G06T 2207/20081* (2013.01); *G06T 2207/20084* (2013.01); *G06T 2207/30242* (2013.01)

(56) References Cited

U.S. PATENT DOCUMENTS

| | | |
|---|---|---|
| 9,602,838 B2 | 3/2017 | Dane et al. |
| 10,304,220 B2 | 5/2019 | Wang |
| 10,319,075 B2 | 6/2019 | Kothule et al. |
| 10,491,815 B2 | 11/2019 | Kajimura et al. |
| 10,701,394 B1 | 6/2020 | Caballero et al. |
| 10,783,617 B2 | 9/2020 | Glotzbach et al. |
| 11,551,333 B2 | 1/2023 | Yu et al. |
| 2019/0149728 A1 | 5/2019 | Kajimura et al. |
| 2020/0053276 A1 | 2/2020 | Kim et al. |
| 2020/0058106 A1 | 2/2020 | Lazarus et al. |
| 2020/0389672 A1 | 12/2020 | Kennett et al. |
| 2021/0012473 A1 | 1/2021 | Putman et al. |
| 2022/0108427 A1 | 4/2022 | Kim et al. |

FOREIGN PATENT DOCUMENTS

| | | |
|---|---|---|
| KR | 10-2033078 B1 | 10/2019 |
| KR | 10-2020-0071866 A | 6/2020 |
| KR | 10-2020-0132682 A | 11/2020 |
| WO | 2022/060088 A1 | 3/2022 |

OTHER PUBLICATIONS

Indian Office Action dated Oct. 7, 2022, issued in Indian Application No. 202141011140.

Wen et al. "Single Image Reflection Removal Beyond Linearity", proceedings of the IEEE Conference on Computer Vision and Pattern Recognition, pp. 3771-3779, Mar. 2019. (Bey Lin).

Yang et al. "Seeing Deeply and Bidirectionally: A Deep Learning Approach for Single Image Reflection Removal", Proceedings of the European Conference on Computer Vision (ECCV), pp. 654-669, 2018. 3, 5, 6 (BDN).

Wei et al. "Single Image Reflection Removal Exploiting Misaligned Training Data and Network Enhancements", Proceedings of the IEEE Conference on Computer Vision and Pattern Recognition, pp. 8178-8187, 2019. 1, 2, 3, 5, 6 (ERRNet).

Zhang et al. "Single Image Reflection Separation with Perceptual Losses", Proceedings of the IEEE Conference on Computer Vision and Pattern Recognition, pp. 4786-4794, 2018. 1, 2, 3, 5, 6, 7.

Li et al. "Single Image Reflection Removal through Cascaded Refinement", Proceedings of the IEEE/CVF Conference on Computer Vision and Pattern Recognition, pp. 3565-3574, 2020. 1, 2, 5, 6 (IBCLN).

Li et al. "Two-Stage Single Image Reflection Removal with Reflection-Aware Guidance", arXiv preprint arXiv:2012.00945, 2020. 1, 2, 3, 5, 6, 7 (RAGNet).

METHOD AND ELECTRONIC DEVICE FOR REMOVING ARTIFACT IN HIGH RESOLUTION IMAGE

CROSS-REFERENCE TO RELATED APPLICATION(S)

This application is a continuation application, claiming priority under § 365 (c), of an International application No. PCT/KR2022/003239, filed on Mar. 8, 2022, which is based on and claims the benefit of an Indian Provisional Specification patent application number 202141011140, filed on Mar. 16, 2021, in the Indian Intellectual Property Office, and of an Indian Complete Specification patent application number 202141011140, filed on Nov. 11, 2021, in the Indian Intellectual Property Office, the disclosure of each of which is incorporated by reference herein in its entirety.

BACKGROUND

1. Field

The disclosure relates to an image processing method. More particularly, the disclosure relates to a method and an electronic device for removing an artifact (also called an artefact) in a high resolution image.

2. Description of Related Art

In general, artifacts such as reflection, moiré, shadows, rain drops, fence, etc., are quite common during image capture by an electronic device.

FIG. 1A is an example scenario in which reflection artifacts (10a) are depicted according to the related art.

FIG. 1B is an example scenario in which moire artifacts (10b) are depicted according to the related art.

FIG. 1C is an example scenario in which shadow artifacts (10c) are depicted according to the related art.

FIG. 1D is an example scenario in which obstruction artifacts (10d) are depicted according to the related art. Both vision methods as well as deep learning methods are generally used to remove such artifacts post capture, according to the related art. The deep learning methods have shown tremendous superiority in recent years. Most of the existing methods work very well for low resolution images (256× 256, 512×512, etc.). The challenges however increase manyfold for high resolution images (16 mega pixel (MP), 32 MP, 64 MP, 108 MP, etc.) because the receptive field cannot linearly scale up to such large image resolutions. For example, if an image of 256×256 resolution requires a receptive field of 32, then an image of 512×512 resolution would require a receptive field of 15 64 to perform artifact removal of similar capability and so on.

FIG. 2A is an example scenario (20a) in which limitations in high resolution artifact removal based on a network complexity are depicted, according to related art. The network complexity is typically measured by accounting number of parameters of a convolutional neural network (CNN). The high resolution (HR) images comprises of millions of pixels to be processed through the CNN. Deploying a complex CNN with millions of parameters can possibly achieve good quality but will be infeasible for real time processing. A low complexity network that can scale well for HR images is extremely crucial for real time processing.

FIG. 2B is an example scenario (20b) in which limitations in high resolution artifact removal based on a static receptive field are depicted, according to the related art. The receptive field of the CNN is the region in the input space that affects a particular output feature. The receptive field remains constant for a given CNN, and does not change for different input image resolutions. Operating with a large receptive field on a small image resolution is overkill (notation a). Operating with a small receptive field on a large image resolution minimizes the global view and hence eventually reduces the capabilities of the artifact removal (notations b, c, and d).

FIG. 2C is an example scenario (20c) in which limitations in high resolution artifact removal based on a training and convergence are depicted, according to the related art. The training is usually performed with patches cropped from the original HR image from the database. The training with large patch sizes (512×512, 1024×1024, 2048×2048) has several disadvantages (e.g., training time is exponentially very high, convergence not guaranteed especially for learning artifact removal because only a small percentage of pixels are affected by artifacts, and the trained model does not adapt to different resolution input image at inference).

FIG. 3A is an example scenario (30a) in which blur free imaging pipeline is depicted, according to the related art.

FIG. 3B is an example scenario (30b) in which blur free imaging pipeline by domain transformation is depicted, according to the related art.

FIG. 3C is an example scenario (30c) in which LR artifact removal is depicted, according to the related art.

FIG. 3D is an example scenario (30d) in which HR artifact removal is depicted, according to the related art.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for removing an artifact in a high resolution image.

Another aspect of the disclosure, is to scale very well to even higher resolution without significant increase in computational complexity.

Another aspect of the disclosure is to remove different type of artifacts especially for very high resolution input images.

Another aspect of the disclosure is to provide a fine level control of the strength of artifact removal that can be dynamically adapted in the context of a deep neural network.

Another aspect of the disclosure is to remove the artifacts for any given input image irrespective of the resolution of the image. The method can be used to analyze the entire image field of view by virtue of large receptive field and hence the neural network is provided with a global view of the image to obtain the best results in terms of restoring an image. The method can be used to provide a fine level control of strength of artifact to be removed and provides a dynamic behavior at similar or lower computational complexity for the very high resolution images.

Another aspect of the disclosure is to identify the number of artifacts in the high resolution image, prioritize the artifacts for removal in sequence, by measuring the extent of complexity in task execution for removal of each artifact, identify one or more sequences of deep neural network (DNN) models from among a plurality of pre-learned models, each identified sequence being capable of removing the artifact of varying complexity, prioritize the sequences of DNN models based on the priority of the artefacts for removal, downscale the high resolution image into a plurality of low resolution images, feed the downscaled images in a pre-determined manner into each prioritized sequence of DNN models, and generate an output high resolution image free from artifacts.

Additional aspects will be set forth in part in the description which follows and, in part, will be apparent from the description, or may be learned by practice of the presented embodiments.

In accordance with an aspect of the disclosure, a method for removing an artifact in a high resolution image by an electronic device is provided. The method includes receiving, by the electronic device, the high resolution image comprising the artifact. Further, the method includes downscaling, by the electronic device, the high resolution image into a plurality of lower resolution images. Further, the method includes removing, by the electronic device, the artifact from the plurality of lower resolution images by applying at least one first machine learning model from a plurality of machine learning models on the plurality of lower resolution images. Further, the method includes generating, by the electronic device, a high resolution image free from the artifact by applying at least one second machine learning model from the plurality of machine learning models on an output from the at least one first machine learning model. The output from each of the machine learning model comprises a low resolution image free from the artifact.

In an embodiment, downscaling, by the electronic device, the high resolution image into the plurality of lower resolution images includes determining, by the electronic device, a number of scales of a Low scale sub-network (LSSNet) based on at least one of a predetermined lookup table, a user input, and a number of artifacts to be removed from the high resolution image, and a type of artifacts to be removed from the high resolution image, and downscaling, by the electronic device, the high resolution image into the plurality of lower resolution images based on the number of scales of the LSSNet.

In an embodiment, removing, by the electronic device, the artifact from the plurality of lower resolution images by applying the at least one first machine learning model on the plurality of lower resolution images includes determining, by the electronic device, a number of artifacts to be removed from the high level resolution image, determining, by the electronic device, a type of each of the artifacts to be removed from the high level resolution image, prioritizing, by the electronic device, the number of artifacts to be removed in a sequence based on the type of each of the artifacts to be removed from the high level resolution image, determining, by the electronic device, a sequence of the at least one first machine learning model of the plurality of machine learning models for removing the artifact from the high level resolution image based on the prioritized number of artifacts, feeding, by the electronic device, each lower resolution image from the plurality of lower resolution images into the at least one first machine learning model based on the determined sequence, and removing, by the electronic device, the artifact from each of the lower resolution images using the at least one first machine learning model.

In an embodiment, generating, by the electronic device, a high resolution image free from the artifact by applying the at least one second machine learning model from the plurality of machine learning models on an output from the at least one first machine learning model includes obtaining, by the electronic device, the output comprising the low resolution image free from the artifact the from the at least one machine learning model, generating, by the electronic device, high resolution output by upscaling the low resolution image free from the artifact using a Convolutional Guided Filter (CGF) of at least second machine learning model from the plurality of machine learning models, wherein the CGF upscale the low resolution image free from the artifact using the higher resolution as a guide, and generating, by the electronic device, the high resolution image free from the artifact by passing the high resolution output from a High Scale Sub-network (HSSNet).

In an embodiment, the CGF is operating at multiple pyramid levels with each level comprising an identical deep learning model with weights and bias being shared across the levels.

In accordance with another aspect of the disclosure, an electronic device for removing an artifact in a high resolution image is provided. The electronic device includes an artifact removal controller communicatively connected to a memory and a processor. The artifact removal controller is configured to receive the high resolution image comprising the artifact and downscale the high resolution image into a plurality of lower resolution images. Further, the artifact removal controller is configured to remove the artifact from the plurality of lower resolution images by applying at least one first machine learning model from a plurality of machine learning models on the plurality of lower resolution images. Further, the artifact removal controller is configured to generate a high resolution image free from the artifact by applying at least one second machine learning model from the plurality of machine learning models on an output from the at least one first machine learning model, wherein the output from each of the machine learning model comprises a low resolution image free from the artifact.

In accordance with another aspect of the disclosure, a method for removing an artifact in a high resolution image by an electronic device is provided. The method includes identifying, by the electronic device, a number of artifacts in the high resolution image. Further, the method includes prioritizing, by the electronic device, the artifacts for removal in sequence by measuring an extent of complexity in task execution for removal of each artifact. Further, the method includes identifying, by the electronic device, one or more sequences of deep neural network (DNN) models from among a plurality of pre-learned models, wherein each identified sequence being capable of removing the artifact of varying complexity. Further, the method includes prioritizing, by the electronic device, the sequences of DNN models based on the priority of the artifacts for removal. Further, the method includes downscaling, by the electronic device, the high resolution image into a plurality of low resolution images. Further, the method includes feeding, by the electronic device, the downscaled images in a pre-determined manner into each prioritized sequence of DNN models. Further, the method includes generating by the electronic device, an output high resolution image free from artifacts.

In accordance with another aspect of the disclosure, an electronic device for removing an artifact in a high resolution image is provided. The electronic device includes an artifact removal controller communicatively connected to a memory and a processor. The artifact removal controller is configured to identify a number of artifacts in the high resolution image and prioritize the artifacts for removal in sequence by measuring an extent of complexity in task execution for removal of each artifact. Further, the artifact removal controller is configured to identify one or more sequences of DNN models from among a plurality of pre-learned models, wherein each identified sequence being capable of removing the artifact of varying complexity. Further, the artifact removal controller is configured to prioritize the sequences of DNN models based on the priority of the artefacts for removal. The artifact removal controller is configured to downscale the high resolution image into a plurality of low resolution images. Further, the artifact removal controller is configured to feed the downscaled images in a pre-determined manner into each prioritized sequence of DNN models. Further, the artifact removal controller is configured to generate an output high resolution image free from artifacts.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
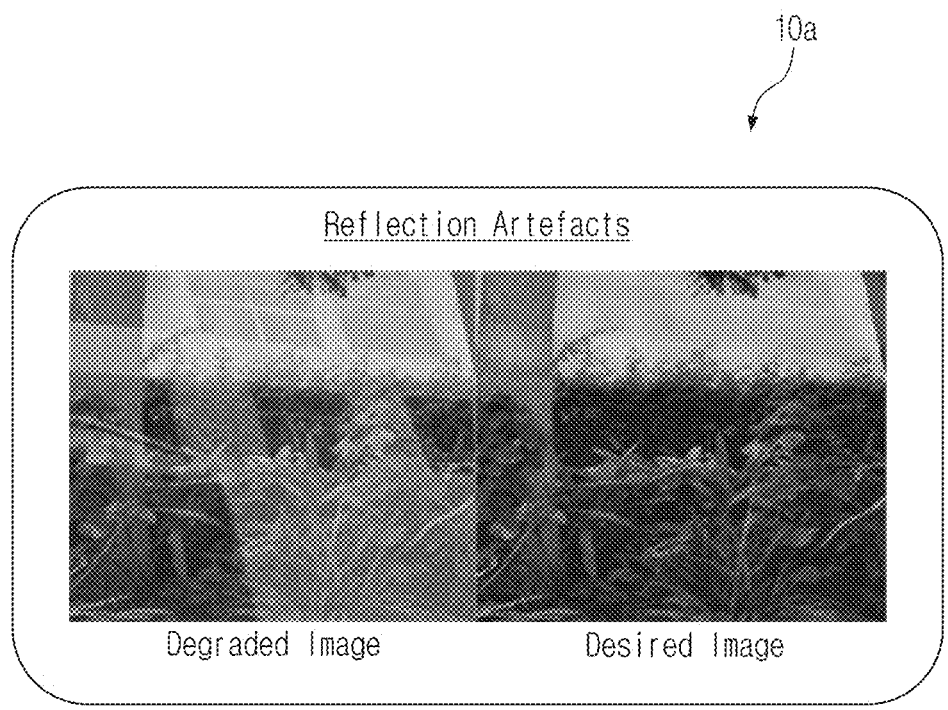
FIG. 1A is an example scenario in which reflection artifacts are depicted, according to the related art.
Figure 1B:
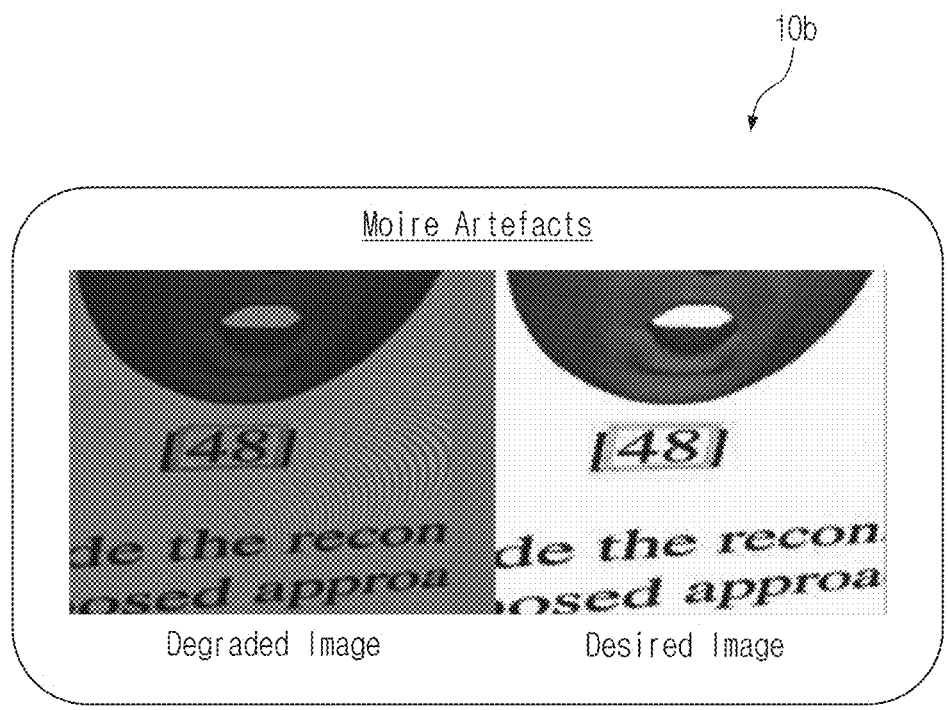
FIG. 1B is an example scenario in which moire artifacts are depicted, according to the related art.
Figure 1C:
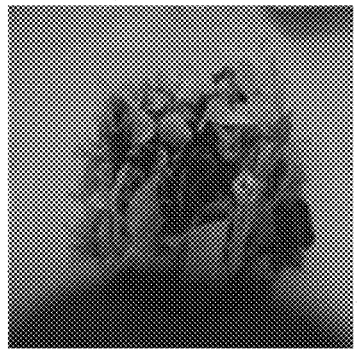
FIG. 1C is an example scenario in which shadow artifacts are depicted, according to the related art.
Figure 1C:
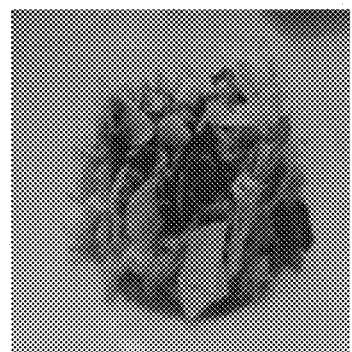
Figure 1D:
FIG. 1D is an example scenario in which obstruction artifacts are depicted, according to the related art.
Figure 1D:
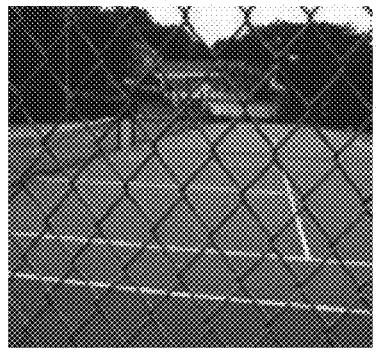
Figure 2A:
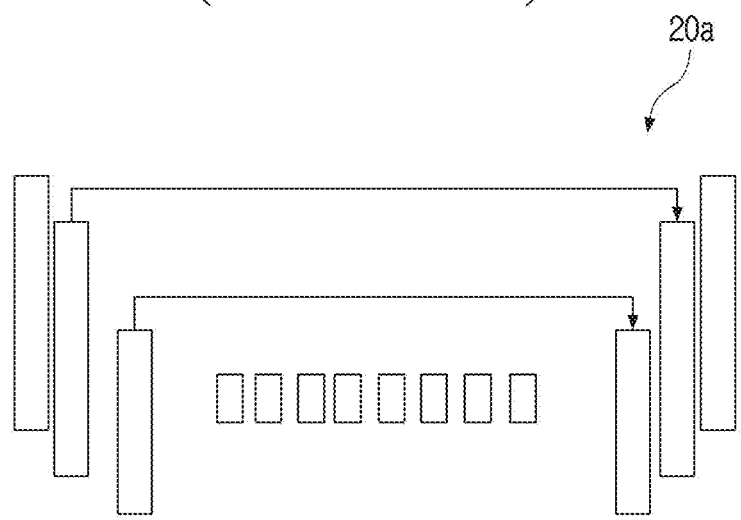
FIG. 2A is an example scenario in which limitations in high resolution artifact removal based on a network complexity are depicted, according to the related art.
Figure 2B:
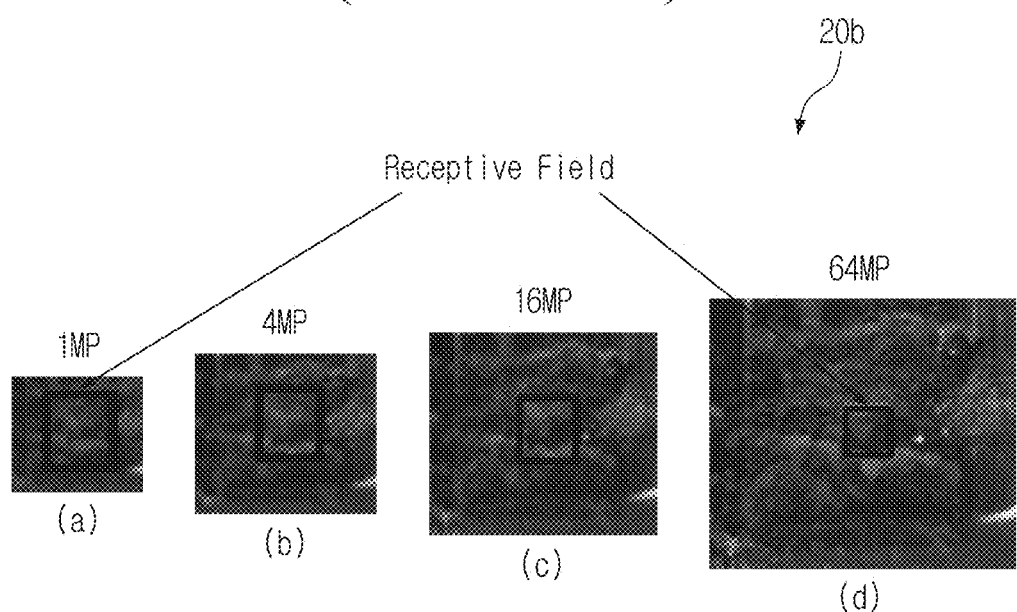
FIG. 2B is an example scenario in which limitations in high resolution artifact removal based on a static receptive field are depicted, according to the related art.
Figure 2C:
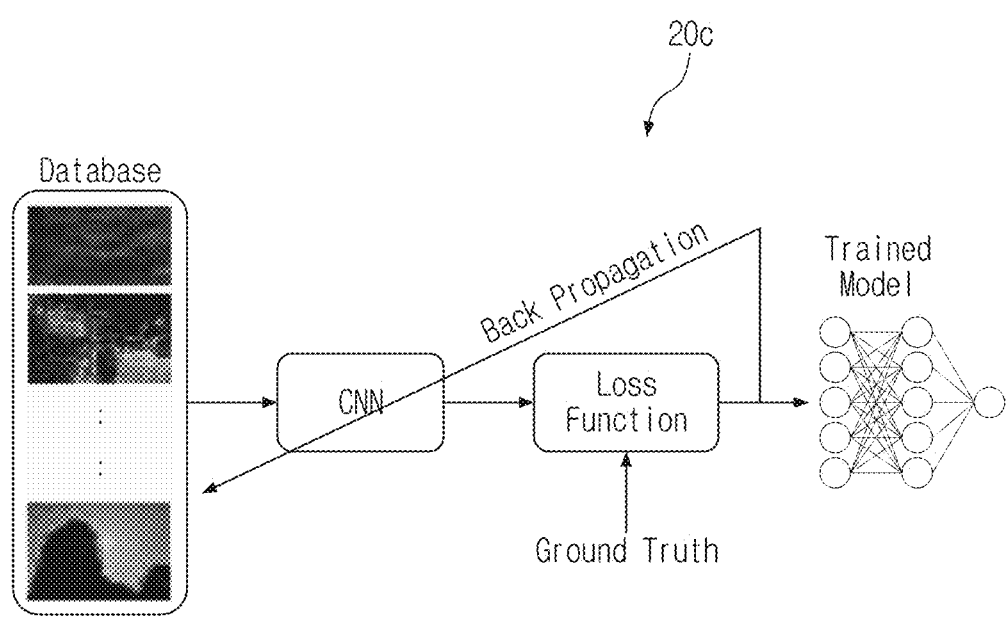
FIG. 2C is an example scenario in which limitations in high resolution artifact removal based on a training and convergence are depicted, according to the related art.
Figure 3A:
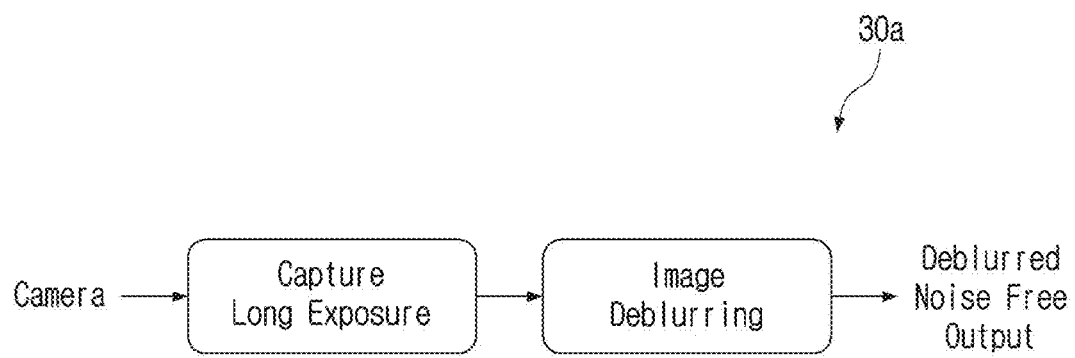
FIG. 3A is an example scenario in which blur free imaging pipeline is depicted, according to the related art.
Figure 3B:
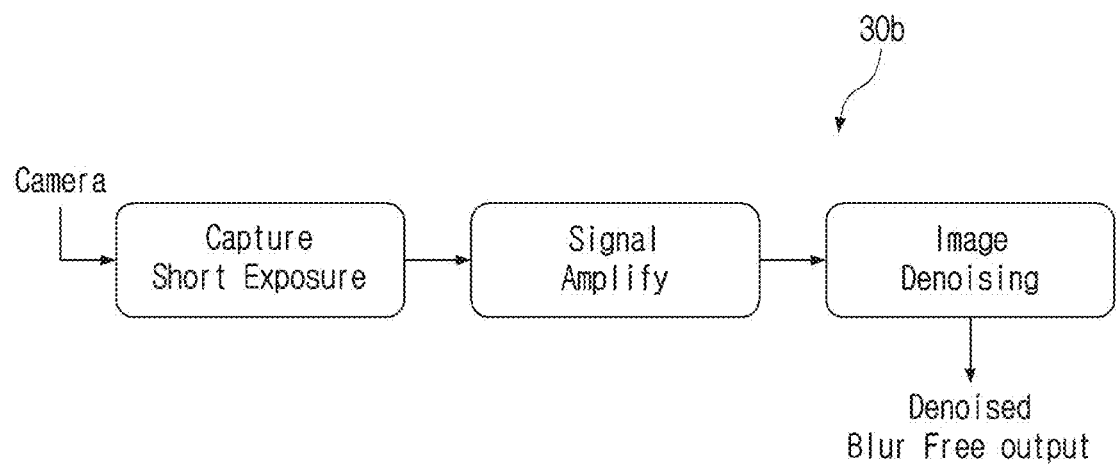
FIG. 3B is an example scenario in which blur free imaging pipeline by domain transformation are depicted, according to the related art.
Figure 3C:
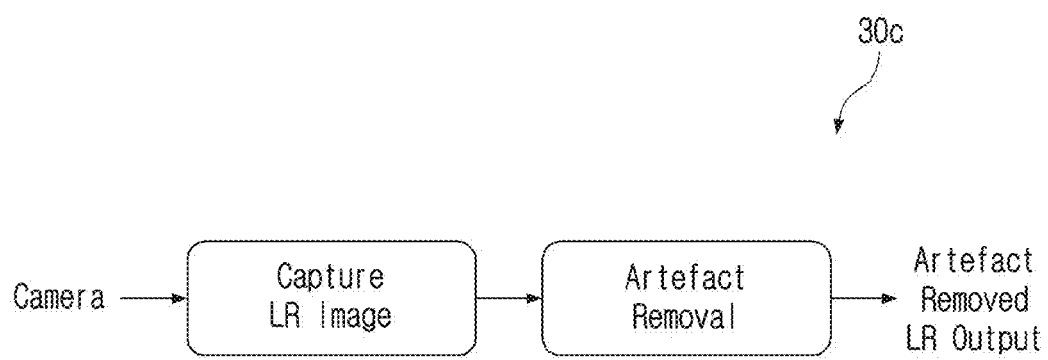
FIG. 3C is an example scenario in which LR artifact removal are depicted, according to the related art.
Figure 3D:
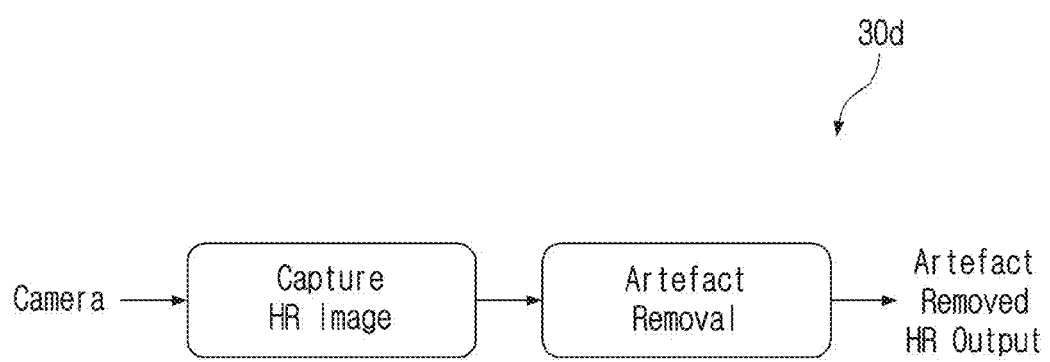
FIG. 3D is an example scenario in which HR artifact removal are depicted, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for removing an artifact in a high resolution image by an electronic device. The method includes receiving, by the electronic device, the high resolution image comprising the artifact. Further, the method includes downscaling, by the electronic device, the high resolution image into a plurality of lower resolution images. Further, the method includes removing, by the electronic device, the artifact from the plurality of lower resolution images by applying at least one first machine learning model from a plurality of machine learning models on the plurality of lower resolution images. Further, the method includes generating, by the electronic device, a high resolution image free from the artifact by applying at least one second machine learning model from the plurality of machine learning models on an output from the at least one first machine learning model. The output from each of the machine learning model comprises a low resolution image free from the artifact.

The disclosed method can be used to remove the artifacts for any given input image irrespective of the resolution of the image. The method can be used to analyze the entire image field of view by virtue of large receptive field and hence the neural network is provided with a global view of the image to obtain the best results in terms of restoring an image. The method can be used to provide a fine level control of strength of artifact to be removed and provides a dynamic behavior at similar or lower computational complexity for the very high resolution images.

The disclosed method can be used to analyze the edge information and use the edge information to remove artifacts in a block based manner. In the disclosed method, the extract restoration parameter based on image restoration is achieved. The method can be used to provide a fine level control of the strength of artifact removal that can be dynamically adapted in the context of a deep neural network.

The method can be used to iteratively generate a variable scale space of images to perform different artifact removal with fine control of output image quality in the presence different type of artifacts present in the image. The disclosed method is targeted towards removal of complex image artifacts such as reflection/moire/shadow/rain/etc., in very high resolution input images.

The method can be used to remove the different type of artifacts especially for very high resolution input images. The method can be used to scale very well to even higher resolution without significant increase in computational complexity. The disclosed method can be used to overcome the limitation by Domain transforming the high resolution (HR) artifact removal into a low resolution (LR) artifact removal followed by multi scale guided pyramid super resolution. The disclosed method is capable of dynamically updating the receptive field depending up on the requirements.

In order to reduce the number of computations, the disclosed method use a deeper architecture only at the lowest scale while the higher scales are processed using shallower networks. The method uses convolutional guided filters to upsample lower scale outputs to provide as guide to higher scales. The disclosed method shares the weights between the sub networks used in the higher levels which helps reduce the memory. The scale space architecture along with shared weights enables to increase the effective receptive field during inference and hence the method generalizes well to high resolution images.

The method uses the Low scale sub-network (LSSNet) to process the lowest scale and a Progressive Inference (PI) stage to process all the higher scales. In order to reduce the computational complexity, the sub-networks in various stage are designed to be much shallower than LSS-Net. Moreover, the method employs weight sharing between various scales within the stage to limit the model size, so as to generalize to very high resolutions without explicit retraining. The method can be used for reflection removal which can easily be deployed on resource limited devices such as smart phones in a fast manner.

Referring now to the drawings and more particularly to FIGS. 4, 5A, 5B, 6 to 10, 11A to 11C, 12A to 12D, 13A to 13D, 14A to 14C, 15, 16A to 16D, 17, 18A to 18C, 19 to 21, 22A, and 22B, where similar reference characters denote corresponding features consistently throughout the figures, there are shown preferred embodiments.

Figure 4:
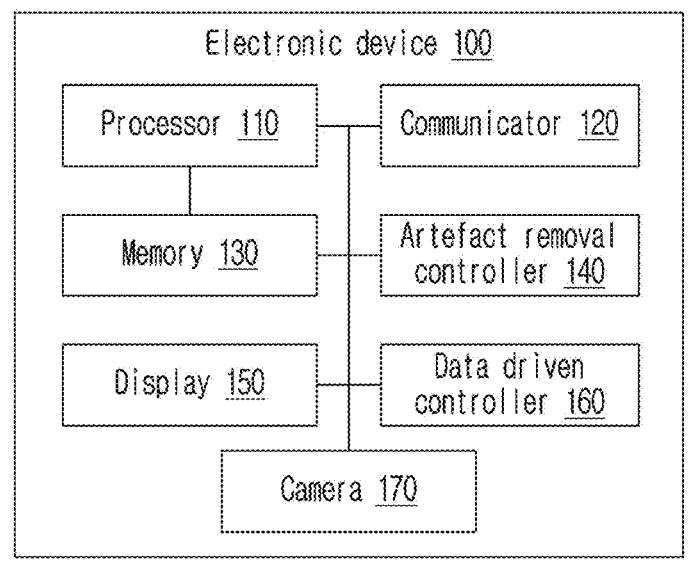
FIG. 4 shows various hardware components of an electronic device for removing an artifact in a high resolution image, according to an embodiment of the disclosure.

FIG. 4 shows various hardware components of an electronic device (100) for removing an artifact in a high resolution image, according to an embodiment of the disclosure. Referring to FIG. 4, I electronic device (100) could be, for example, a smart phone, a smart watch, an internet of things (IoT) device, an immersive device, a virtual reality device, a tablet, or a TV. The electronic device (100) includes a processor (110), a communicator (120), a memory (130), an artifact removal controller (140), a display (150), a data driven controller (160) and a camera (170). The processor (110) is connected with the communicator (120), the memory (130), the artifact removal controller (140), the display (150), the data driven controller (160) and the camera (170).

The artifact removal controller (140) is configured to receive the high resolution image comprising the artifact. After receiving the high resolution image comprising the artifact, the artifact removal controller (140) is configured to determine a number of scales of an LSSNet based on a predetermined lookup table, a user input, and a number of artifacts to be removed from the high resolution image, and a type of artifacts to be removed from the high resolution image. Based on the number of scales of the LSSNet, the artifact removal controller (140) is configured to downscale the high resolution image into the plurality of lower resolution images. Further, the artifact removal controller (140) is configured to determine a number of artifacts to be removed from the high resolution image and determine a type of each of the artifacts to be removed from the high resolution image. Further, the artifact removal controller (140) is configured to prioritize the number of artifacts to be removed in a sequence based on the type of each of the artifacts to be removed from the high resolution image.

Further, the artifact removal controller (140) is configured to determine a sequence of a first machine learning model of a plurality of machine learning models for removing the artifact from the high resolution image based on the prioritized number of artifacts. Based on the determined sequence, the artifact removal controller (140) is configured to feed each lower resolution image from the plurality of lower resolution images into the first machine learning model. Further, the artifact removal controller (140) is configured to remove the artifact from each of the lower resolution images using the at least one first machine learning model. Further, the artifact removal controller (140) is configured to obtain the output comprising the low resolution image free from the artifact from the at least one machine learning model. Further, the artifact removal controller (140) is configured to generate high resolution output by upscaling the low resolution image free from the artifact using a Convolutional Guided Filter (CGF) of a second machine learning model from the plurality of machine learning models. The CGF upscales the low resolution image free from the artifact using the higher resolution as a guide. The CGF operates at multiple pyramid levels with each level comprising an identical deep learning model with weights and bias being shared across the levels. Further, the artifact removal controller (140) is configured to generate the high resolution image free from the artifact by passing the high resolution output from a High Scale Sub-network (HSSNet).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIGS. 3A to 3D show various hardware components of the electronic device (100) but it is to be understood that other embodiments are not limited thereon. In other embodiments, the electronic device (100) may include a larger or smaller number of components. Further, the labels or names of the components are used only for illustrative purpose and does not limit the scope of the disclosure. One or more components can be combined together to perform same or substantially similar function in the electronic device (100).

Figure 5A:
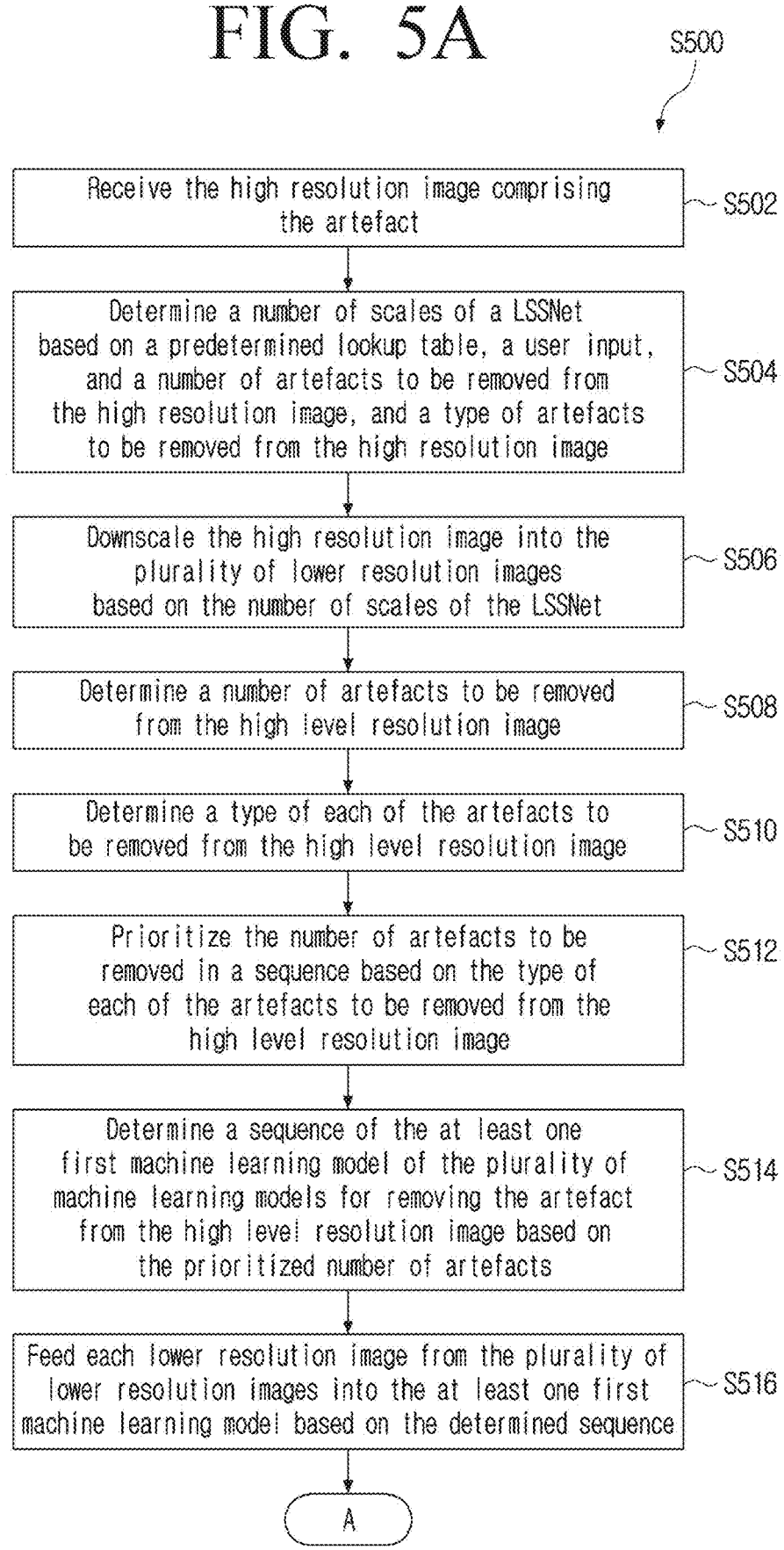
FIGS. 5A and 5B is a flow chart illustrating a method for removing the artifact in the high resolution image, according to an embodiment of the disclosure.
Figure 5B:
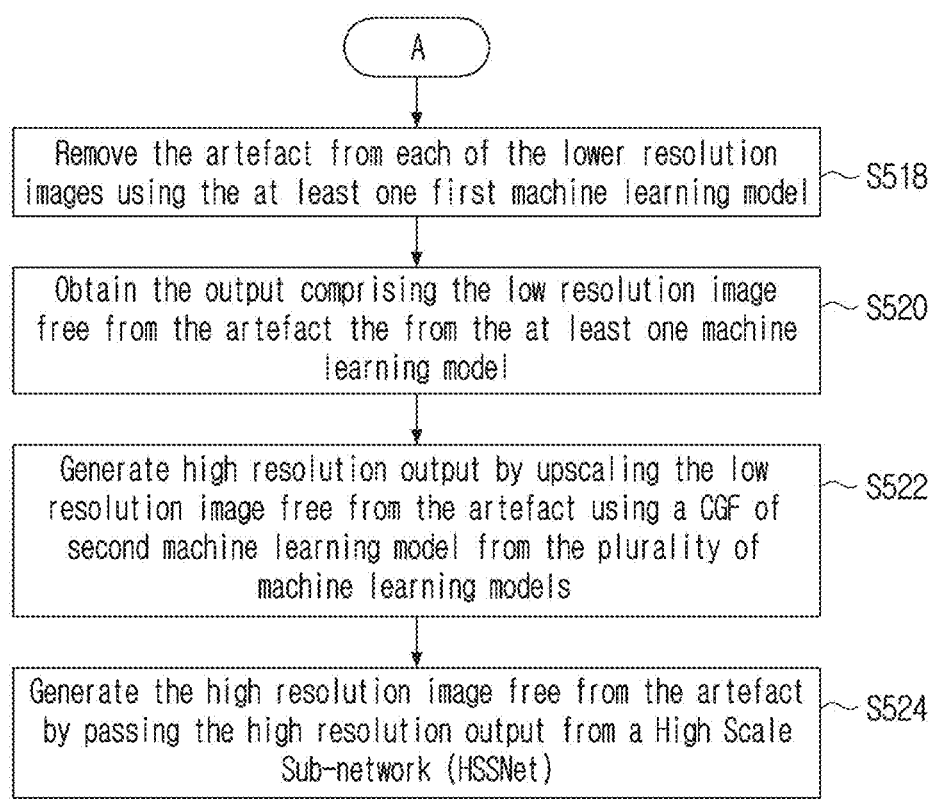

FIGS. 5A and 5B are a flow chart (S500) illustrating a method for removing an artifact in the high resolution image, according to an embodiment of the disclosure. The operations (S502-S524) are performed by the artifact removal controller (140).

Referring to FIG. 5A, at operation S502, the method includes receiving the high resolution image comprising the artifact. At operation S504, the method includes determining the number of scales of the LSSNet based on the predetermined lookup table, the user input, and a number of artifacts to be removed from the high resolution image, and a type of artifacts to be removed from the high resolution image. At operation S506, the method includes downscaling the high resolution image into the plurality of lower resolution images based on the number of scales of the LSSNet. At operation S508, the method includes determining the number of artifacts to be removed from the high resolution image. At operation S510, the method includes determining the type of each of the artifacts to be removed from the high resolution image.

At operation S512, the method includes prioritizing the number of artifacts to be removed in a sequence based on the type of each of the artifacts to be removed from the high resolution image. At operation S514, the method includes determining the sequence of the first machine learning model of the plurality of machine learning models for removing the artifact from the high resolution image based on the prioritized number of artifacts. At operation S516, the method includes feeding each lower resolution image from the plurality of lower resolution images into the at least one first machine learning model based on the determined sequence. Referring to FIG. 5B, at operation S518, the method includes removing the artifact from each of the lower resolution images using the first machine learning model. At operation S520, the method includes obtaining the output comprising the low resolution image free from the artifact from the at least one machine learning model. At operation S522, the method includes generating the high resolution output by upscaling the low resolution image free from the artifact using a CGF of second machine learning model from the plurality of machine learning models. At operation S524, the method includes generating the high resolution image free from the artifact by passing the high resolution output from an HSSNet.

The disclosed method can be used to remove the artifacts for any given input image irrespective of the resolution of the image. The method can be used to analyze the entire image field of view by virtue of large receptive field and hence the neural network is provided with a global view of the image to obtain the best results in terms of restoring an image. The method can be used to provide a fine level control of strength of artifact to be removed and provides a dynamic behavior at similar or lower computational complexity for the very high resolution images.

In order to reduce the number of computations, the disclosed method uses a deeper architecture only at the lowest scale while the higher scales are processed using shallower networks. The method uses convolutional guided filters to upsample lower scale outputs to provide as guide to higher scales. The disclosed method shares the weights between the sub networks used in the higher levels which helps reduce the memory. The scale space architecture along with shared weights enables us to increase the effective receptive field during inference and hence our method generalizes well to high resolution images.

The method can be used to provide a fine level control of the strength of artifact removal that can be dynamically adapted in the context of a deep neural network.

The various actions, acts, blocks, steps, or the like in the flow charts (S400) may be performed in the order presented, in a different order or simultaneously. Further, in some embodiments, some of the actions, acts, blocks, steps, or the like may be omitted, added, modified, skipped, or the like without departing from the scope of the disclosure.

Figure 6:
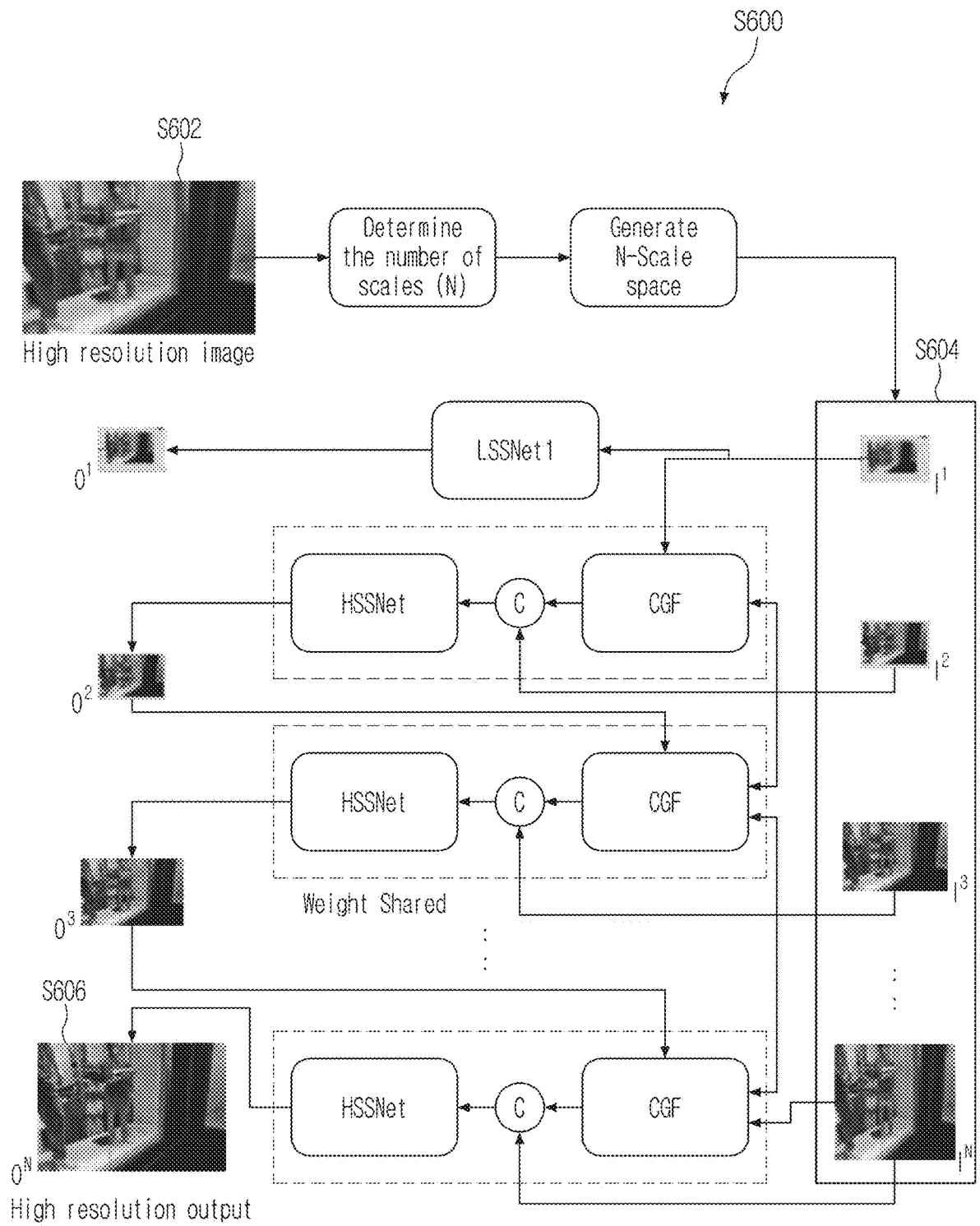
FIGS. 6, 7, and 8 are example scenarios in which the electronic device removes the artifact in the high resolution image, according to various embodiments of the disclosure.
Figure 7:
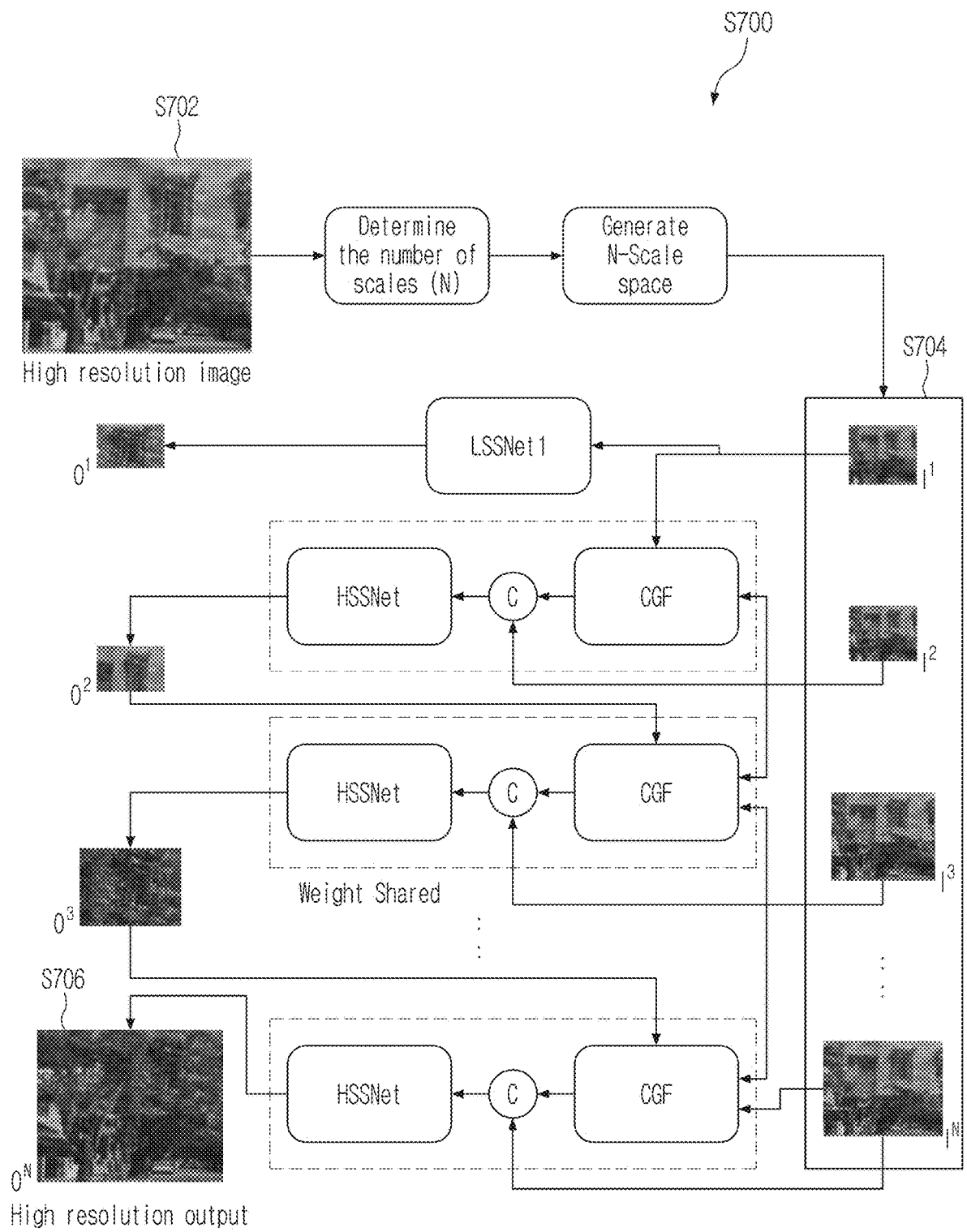
Figure 8:
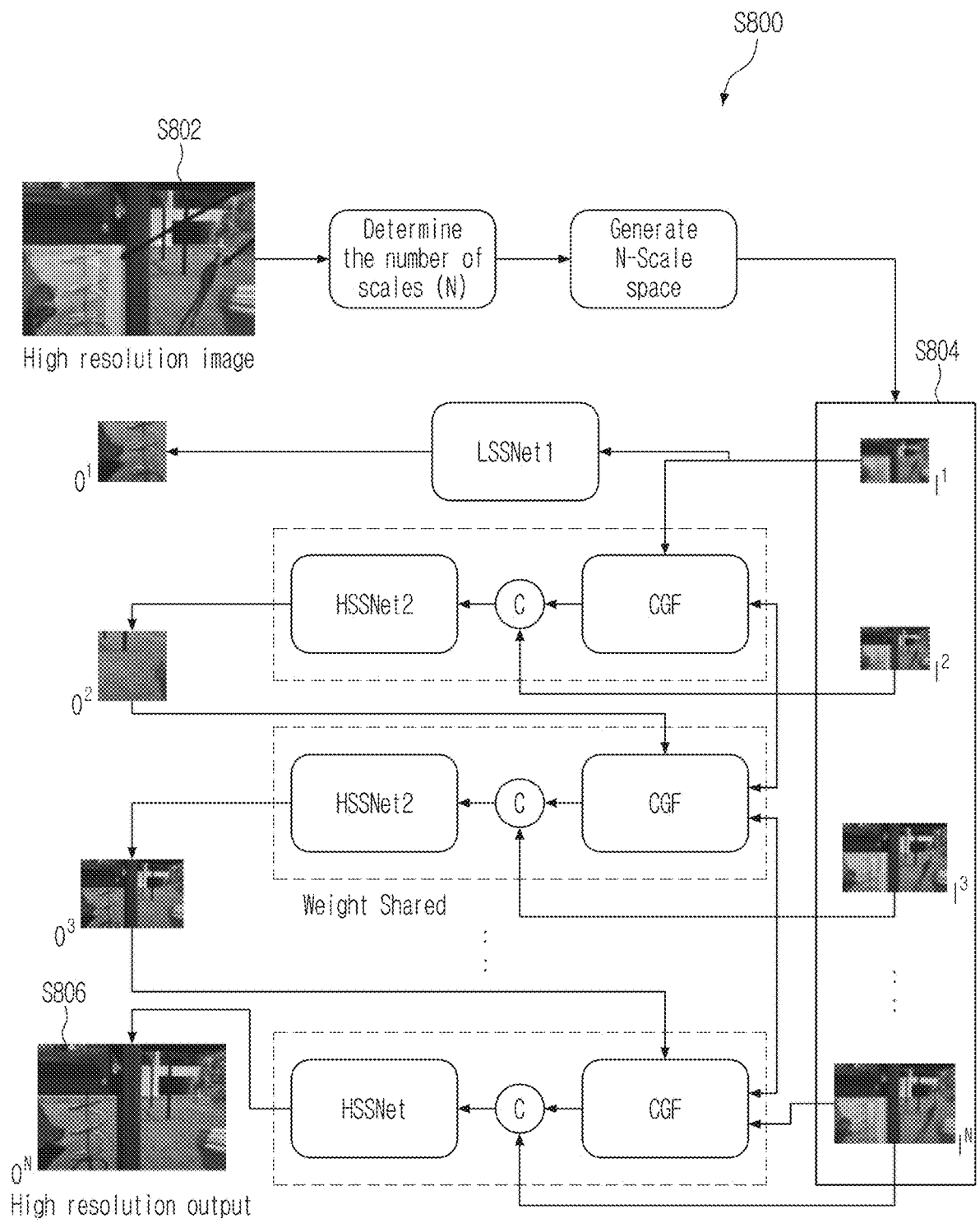

FIGS. 6, 7, and 8 are example scenarios (S600, S700, and S800) in which the electronic device (100) removes the artifact in the high resolution image, according to various embodiments of the disclosure.

Given a corrupted input image (I) of resolution H×W at operation S602, the disclosed method determines the number of scales N as $$N = \max\left(1, \operatorname{ceil}\left(1 + \log_2\left(\frac{\min(H, W)}{k}\right)\right)\right) \quad \text{Equation 1}$$

where k has to be greater than the receptive field of all the sub-networks used in the pipeline, and is chosen as 300 for the disclosed method.

Next, an N-scale space representation of the input image is constructed using a Gaussian pyramid. The final reflection free output image is generated from the scale space two stages: a) Low scale sub-network (LSSNet) and b) Progressive Inference (PI) of the higher scales using Convolutional Guided Filter up-sampling (CGF) and High Scale Sub-network (HSSNet) (explained in the FIGS. 9 and 10).

The electronic device (100) identifies the number of artifacts in the high resolution image and prioritizes the artifacts for removal in sequence at operation S604, by measuring the extent of complexity in task execution for removal of each artifact. Further, the electronic device (100) identifies one or more sequences of DNN models from among a plurality of pre-learned models, each identified sequence being capable of removing the artifact of varying complexity. Further, the electronic device (100) prioritizes the sequences of DNN models based on the priority of the artifacts for removal. Further, the electronic device (100) downscales the high resolution image into a plurality of low resolution images. Further, the electronic device (100) feeds the downscaled images in the pre-determined manner into each prioritized sequence of DNN models. Further, the electronic device (100) generates an output high resolution image free from the artifacts at operation S606.

Referring to FIG. 7, in another example, the electronic device (100) receives an input image degraded by artifacts (reflection, shadow etc.) for correction at operation S702. Further, the electronic device (100) analyzes the HR input image to generate number of low resolution input images ($I^1$, $I^2$, ... $I^N$) at operation S704. Further, the electronic device (100) dynamically selects a sequence of M deep learning models based on the number and strength of artifact correction required. Further, the electronic device (100) passes the number of low resolution image to the plurality (M) of deep learning models (M<=N). Further, the electronic device (100) performs the artifact removal on the N low resolution images using M deep learning models. Further, the electronic device (100) generates the high resolution corrected output $O^N$ at operation S706 from N−1 intermediate outputs ($O^1$, $O^2$, ... $O^{N-1}$) from M deep learning models and low resolution input images $I^1$, $I^2$, ... $I^N$.

The number of scales (N) is computed by either a predetermined look up table or through user input or image analysis. The M deep learning models comprise a first plurality of DNN networks and a second plurality of DNN networks, where the first plurality of DNN networks remove the required artifacts sequentially. The second plurality of DNN networks comprise a convolution guided filter operating at multiple pyramid levels with each level comprising of an identical deep learning model with weights and bias being shared across all levels. The second plurality of DNN networks is less complex than the first plurality of DNN networks. The input images are fed to the respective DNN respectively in a sequential manner. Table 1 represents the MAC operations/pixel based on an input resolution and network.

TABLE 1

| No. of Levels (N) | Input Resolution | Network | MAC Operations/Pixel |
|---|---|---|---|
| 1 | W × H | LSSNet | 49K |
| 2 | W/2 × H/2 | LSSNet + HSSNet | 25K |
| 3 | W/4 × H/4 | LSSNet + 2*HSSNet | 18K |
| 4 | W/8 × H/8 | LSSNet + 3*HSSNet | 16.5K |
| 5 | W/16 × H/16 | LSSNet + 4*HSSNet | 16.01K |

Table 1 represents the MAC operations/pixel based on an input resolution and network.

The operations S802, S804, and S806 of FIG. 8 are similar to the operations S702, S704, and S706 of FIG. 7. For the sake of clarity, repeated descriptions of the operations are omitted.

Figure 9:
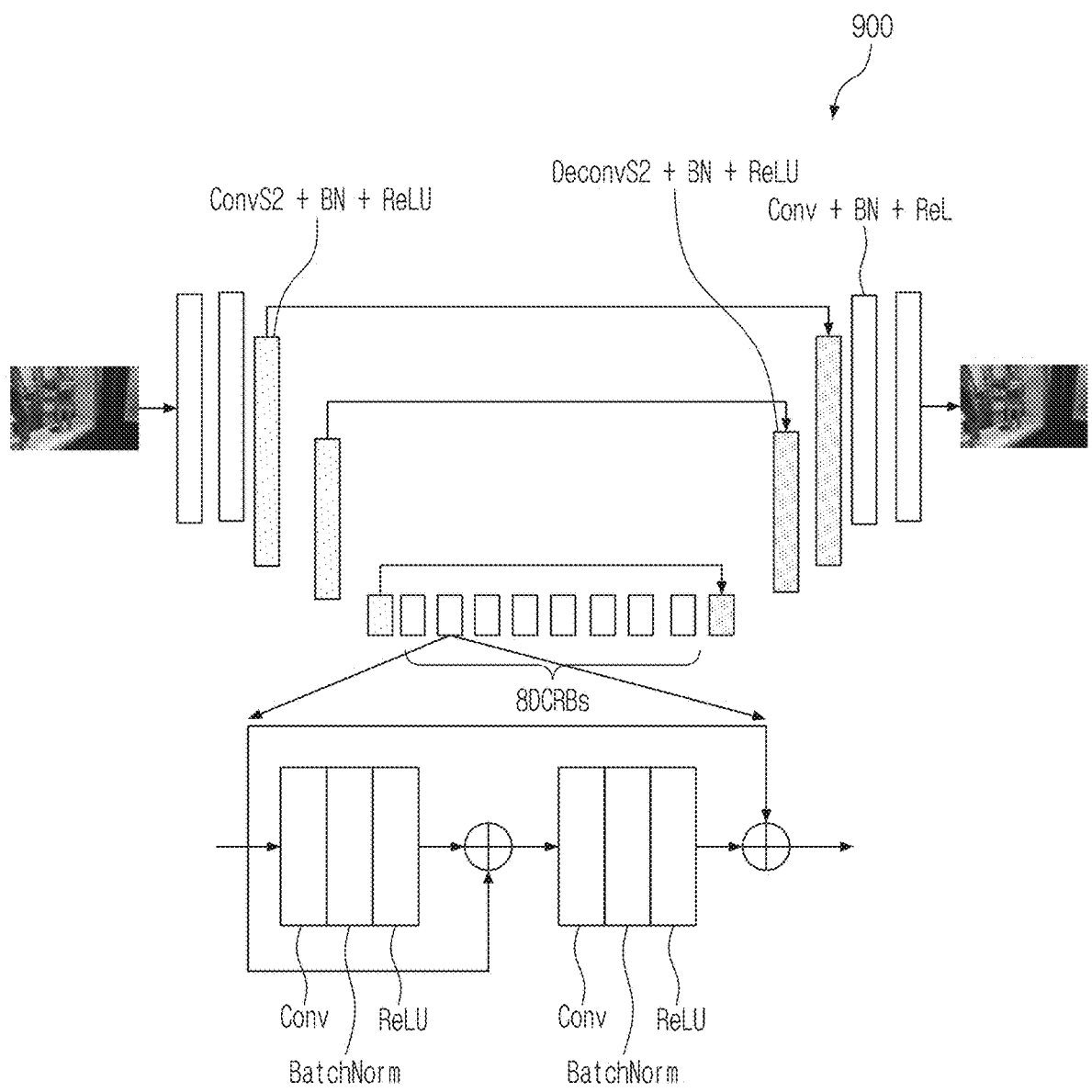
FIG. 9 is an example scenario in which a Low scale sub-network (LSSNet) is depicted, according to an embodiment of the disclosure.

FIG. 9 is an example scenario 900 in which the LSSNet is depicted, according to an embodiment of the disclosure. The input image at the lowest scale is passed to LSSNet to generate an estimate of the output image ($O^1$) at scale 1. The network architecture of LSSNet is provided in FIG. 9, the design is similar to a U-net with additional enhancements. The encoder blocks consist of 2 convolutional blocks of stride 1 followed by 3 convolutional blocks of stride 2. Each convolutional block follows Conv-BatchNorm-ReLU pattern. The encoder is followed by 8 Double Convolutional Residual Blocks (DCRB). The DCRBs are introduced in the lowest level to minimize the computational complexity. Each DCRB consists of two convolutional layers with skip connections. This is followed by a decoder block to up-sample the features back to the original resolution. The decoder block consists of 3 deconvolutional layers of stride 2 followed by 2 convolutional layers of stride 1. Skip connections are provided between encoder and decoder blocks to pass information between feature maps of corresponding spatial dimensions. All the skip connections are implemented using element-wise addition that reduces the computational complexity.

The iterative Progressive Inference (PI) scheme is used for estimating $O^s$ for scales $\{2, \ldots, N\}$ once $O^1$ is estimated. The output image for any scale s can iteratively be estimated using equation (2)

$$O^s = PI(I^s, I^{s-1}, O^{s-1}) \qquad \text{Equation 2}$$

The PI function is implemented using two cascaded blocks: Convolutional Guided Filter (CGF) for up-sampling $O^{s-1}$ and High Scale Sub-network (HSSNet) for removing reflections from each scale.

The CGF block to upsample the $O^{s-1}$ using higher resolution $I^s$ as a guide. The CGF block is a fast end-to-end trainable version of the classical guided filter. The CGF blocks have been successfully used to improve the computational efficiency of solutions in domains such as dehazing, image matting and style transfer. The flow diagram of CGF block is shown in the FIG. 9. It accepts 3 images: low resolution input $I^{s-1}$, low resolution output $O^{s-1}$ and high resolution input $I^s$ to generate the high resolution output Os'. The CGF block generates much sharper output images as opposed to methods with deconvolutional filters. Moreover, the CGF block is lightweight and adds minimal computation overhead to the solution.

The high resolution output $O^{s'}$ generated by the CGF block needs to be further refined to generate the output image $O^s$ for scale s. The HSSNet also follows an encoder-decoder architecture similar to LSSNet. However, since HSSNet operates on higher scales, the DCRB blocks are not used in order to reduce computational complexity.

The weights for CGF and HSSNet are shared across all the scales. The weight sharing enables reusing the PI block iteratively over multiple scales, benefit of which is two-fold. First, the weight sharing drastic reduces the number of parameters required for a N-scale space pyramid especially when N is large, hence reducing the memory footprint of the solution. Second, since the PI blocks can be reused over scales, the disclosed solution can realistically remove reflections from a wide range of input resolutions without the need for retraining, by simply varying N. Moreover, the disclosed method can increase the receptive field by a factor of 2 N while the computation time increases only by 4/3 $(1-\frac{1}{4}^N)$ where N is the number of scales. This enables efficient reflection removal from very high resolution images while keeping the computation and memory constraints and hence can be deployed on an embedded device with ease.

Both the sub networks LSSNet and HSSNet are trained using a combination of different loss functions that comprise pixel and feature losses. The pixel wise intensity difference is penalized using a combination of 3 component losses as given in Equation (3)

$$L_p = \alpha \|\hat{O} - O\|_2^2 + \beta \|\hat{O} - O\|_1 + \gamma (\|\nabla_x \hat{O} - \nabla_x O\|_1 + \|\nabla_y \hat{O} - \nabla_y O\|_1) \qquad \text{Equation 3}$$

where, $\nabla x$ and $\nabla y$ are the gradient operators along x and y directions respectively and $\hat{O}$ and O are respectively the estimated transmission output and ground truth. The contextual loss helped in minimizing color artifacts while training with aligned data and also provided the much needed stability during training using equation (4).

$$L_c = -\log(CX(\Phi^l(\hat{O}), \Phi^l(O))) \qquad \text{Equation 4}$$

where $\varnothing^l(\hat{O})$ and $\varnothing^l(O)$ are the feature maps extracted from layer l of the perceptual network, which in our case is VGG19 network. The total loss is a combination of both the pixel loss and contextual loss using equation (4).

$$L = L_p + \delta L_c \qquad \text{Equation 5}$$

Figure 10:
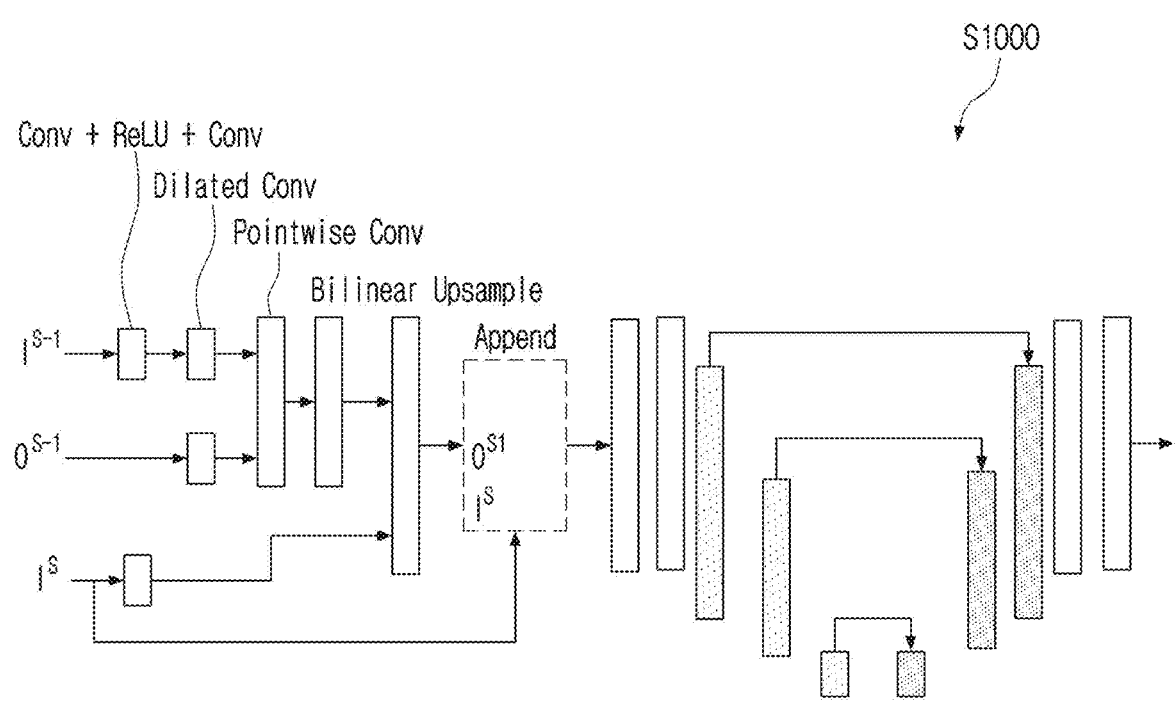
FIG. 10 is an example scenario in which a convolution guided filter and High Scale Sub-network (HSSNet), according to an embodiment of the disclosure.

FIG. 10 is an example scenario S1000 in which a convolution guided filter and HSSNet, according to an embodiment of the disclosure.

Figure 11A:
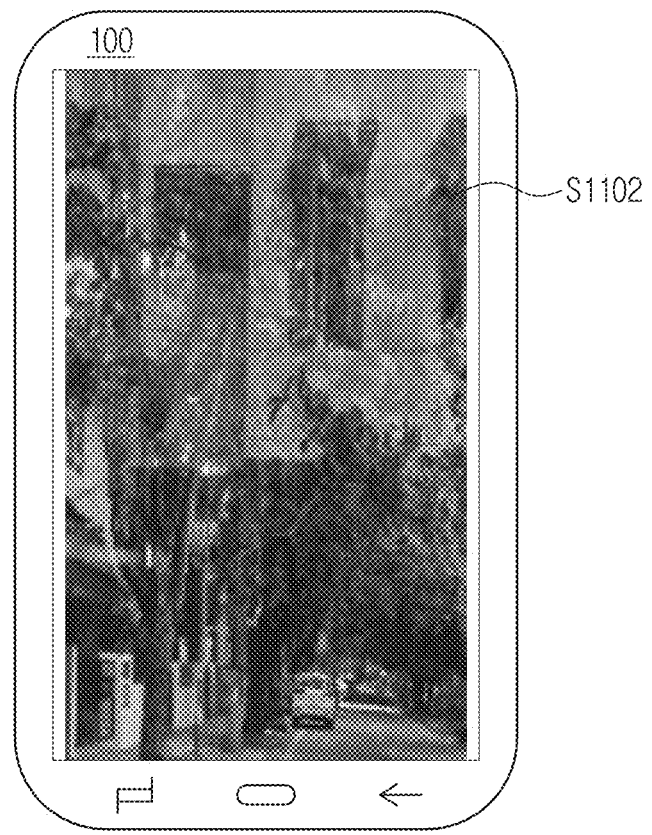
FIGS. 11A, 11B, and 11C are example scenarios in which a variable artifact removal strength is depicted, according to various embodiments of the disclosure.
Figure 11B:
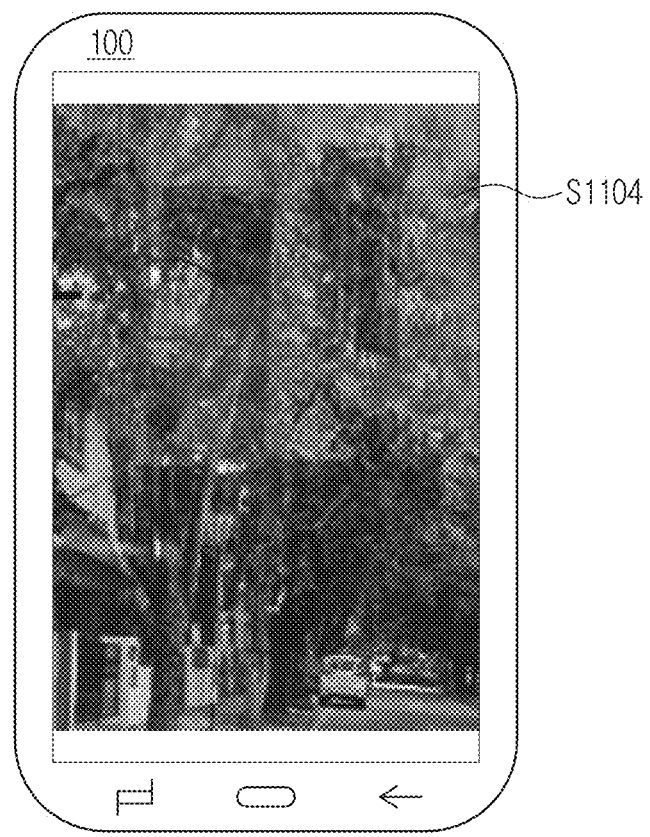
Figure 11C:
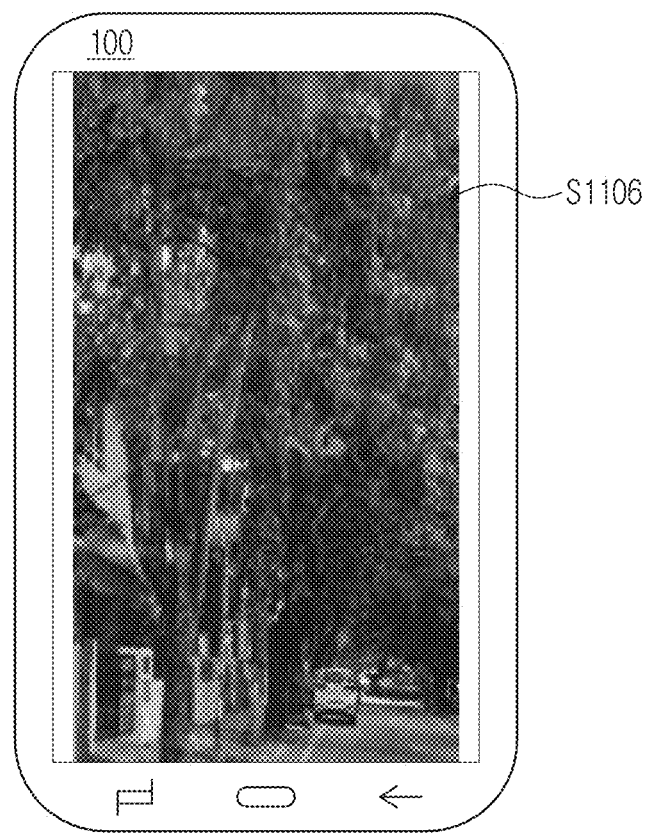
Figure 12A:
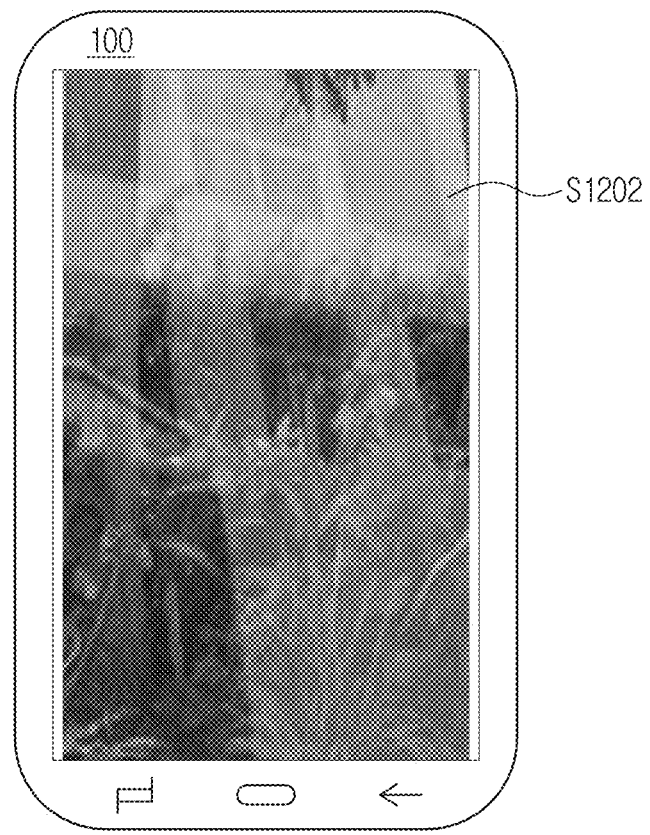
FIGS. 12A, 12B, 12C, and 12D are example scenarios in which inter disciplinary artifacts are depicted according to various embodiments of the disclosure.
Figure 12B:
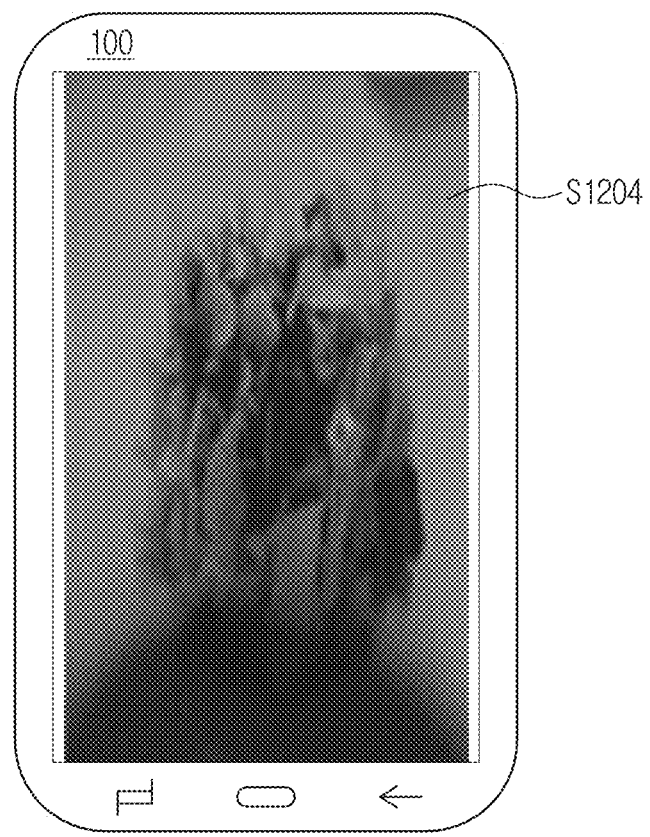
Figure 12C:
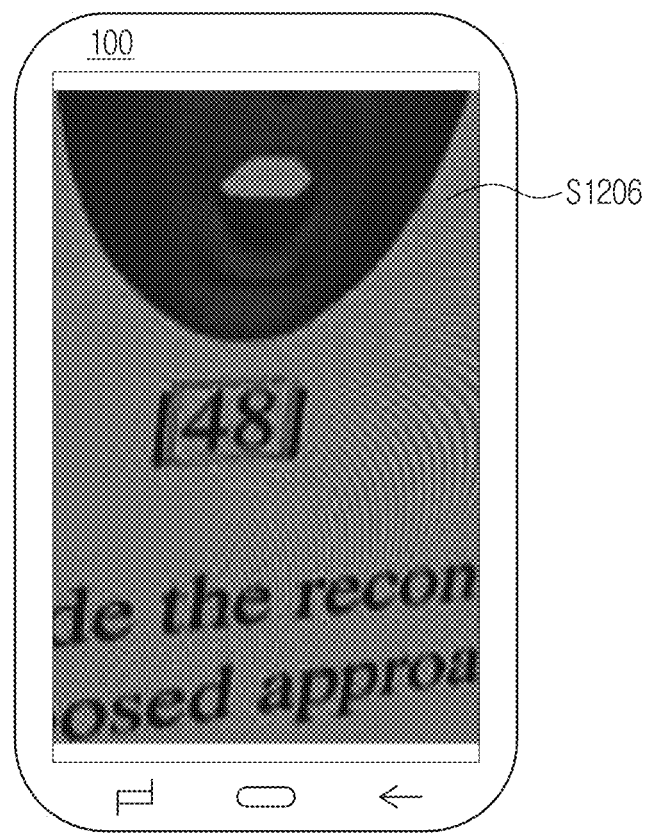
Figure 12D:
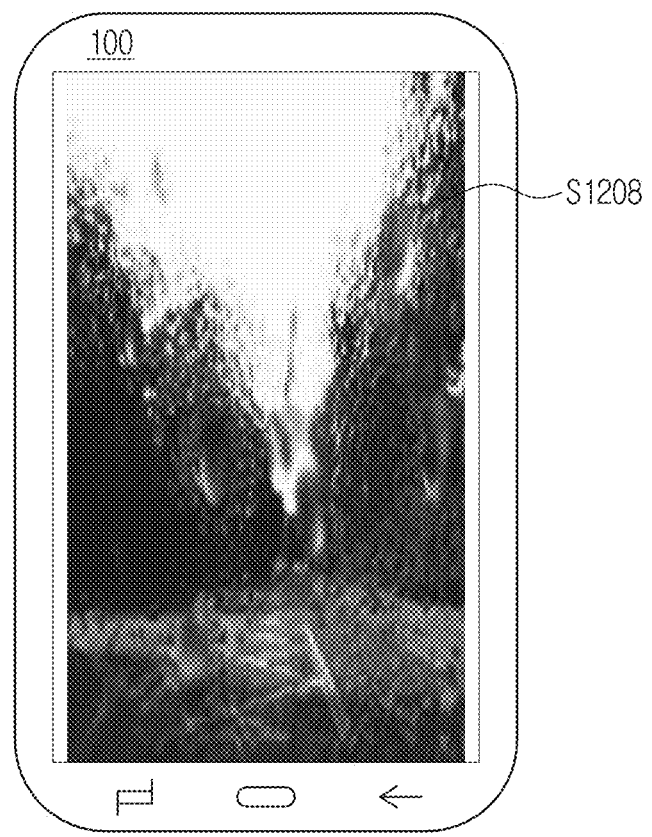
Figure 13A:
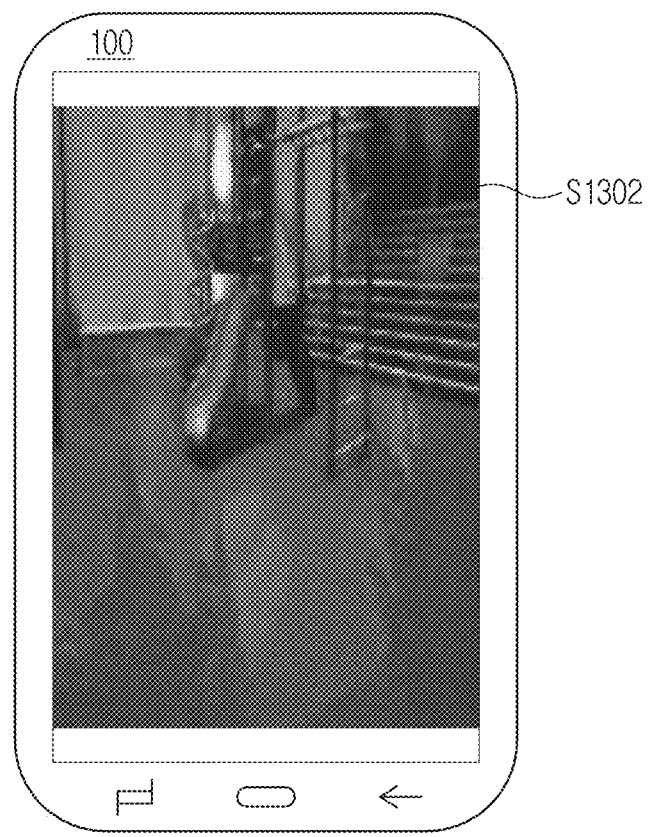
FIGS. 13A, 13B, 13C, and 13D are example scenarios in which intra disciplinary artifacts for a reflection artifact are depicted according to various embodiments of the disclosure.
Figure 13B:
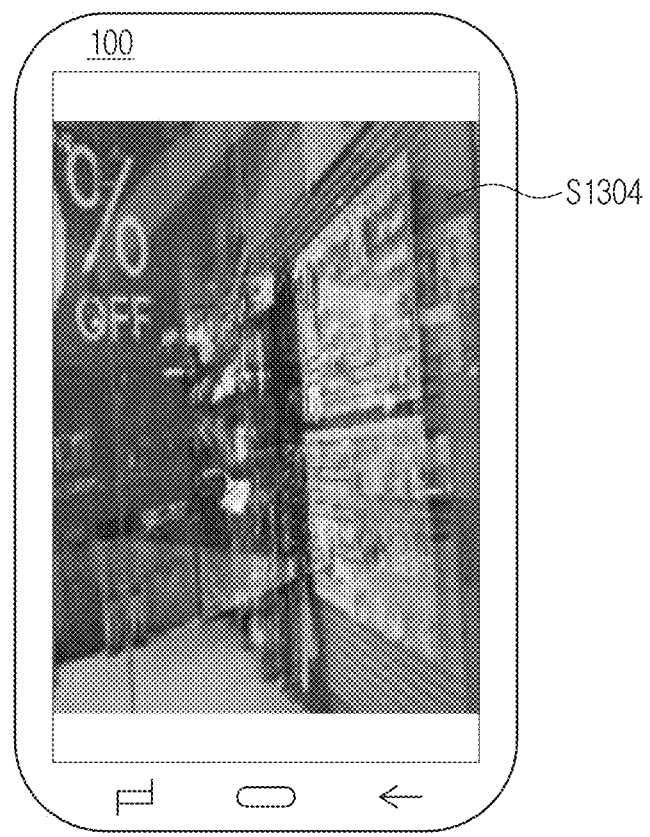
Figure 13C:
Figure 13D:
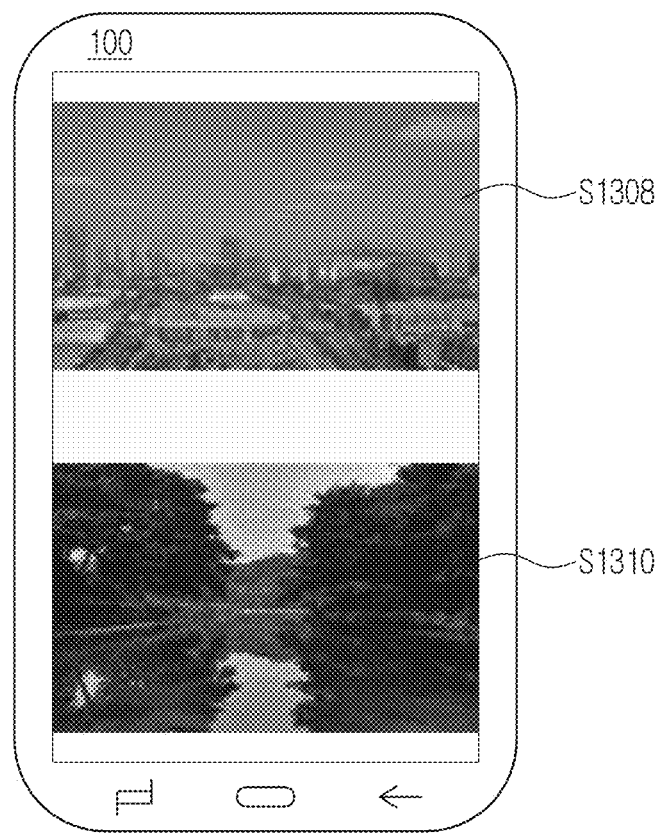

FIGS. 11A, 11B, and 11C are example scenarios in which a variable artifact removal strength is depicted, according to various embodiments of the disclosure. Based on the disclosed method, the electronic device (100) depicts the low strength removal (S1102) referring to FIG. 11A. The electronic device (100) depicts the medium strength removal (S1104) referring to FIG. 11B. The electronic device (100) depicts the high strength removal (S1106) referring to FIG. 11C.

FIGS. 12A to 12D are example scenarios in which the inter-disciplinary artifacts are depicted according to various embodiments of the disclosure. The electronic device (100) depicts the reflection artifacts (S1202) referring to FIG. 12A. The electronic device (100) depicts the shadow artifacts (S1204) referring to FIG. 12B. The electronic device (100) depicts the moire artifacts (S1206) referring to FIG. 12Cc. The electronic device (100) depicts the Rain drop artifacts (S1208) referring to FIG. D.

FIGS. 13A to 13D are example scenarios in which the intra disciplinary artifacts for reflection artifact are depicted according to various embodiments of the disclosure. The electronic device (100) depicts the low strength artifacts (S1302) referring to FIG. 13A. The electronic device (100) depicts the medium strength artifacts (S1304) referring to FIG. 13B. The electronic device (100) depicts the high strength artifacts (S1306) referring to FIG. 13C. The electronic device (100) depicts the light source reflections artifacts (S1308) and the mirror like reflections artifacts (S1310) referring to FIG. 13D.

Figure 14A:
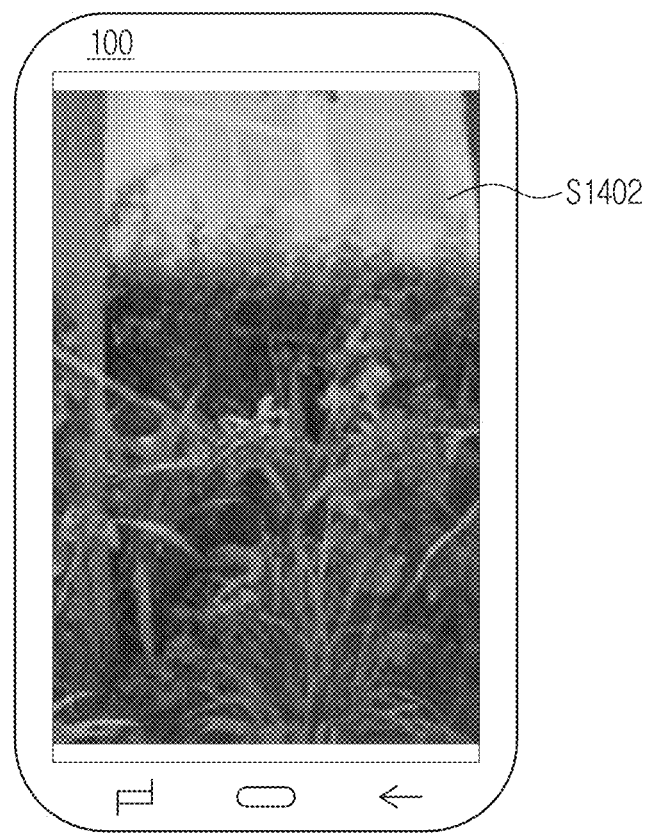
FIG. 14A is an example scenario in which thumbnail processing is depicted, according to an embodiment of the disclosure.

FIG. 14A is an example scenario (S1402) in which thumbnail processing is depicted, according to an embodiment of the disclosure.

Referring to FIG. 14A, in an example, smartphone cameras support resolutions up to 108 MP and zoom factor up to 100×. The typical DNN based artifact removal methods do not scale well to handle larger resolution due to fixed receptive field. Based on the disclosed method, receptive field can be easily changed dynamically by changing number of scale-space levels. This allows for better artifacts removal at varying resolutions/zoom factors without any retraining. As shown in the FIG. 14a, the captured images are first shown as thumbnails. The artifacts in thumbnails can be removed using a lower receptive field.

Figure 14B:
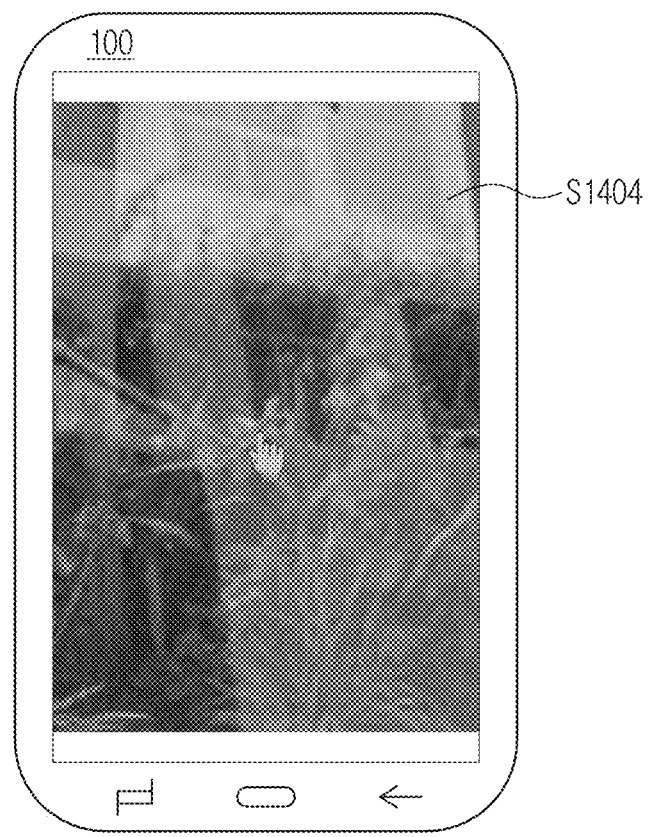
FIG. 14B is an example scenario in which gallery processing is depicted, according to an embodiment of the disclosure.

FIG. 14B is an example scenario (S1404) in which gallery processing is depicted, according to an embodiment of the disclosure.

Referring to FIG. 14B, the user of the smart phone (100) views the image in the gallery. The gallery images are displayed at a lower resolution (~2 MP). The higher receptive field than thumbnail is used here.

Figure 14C:
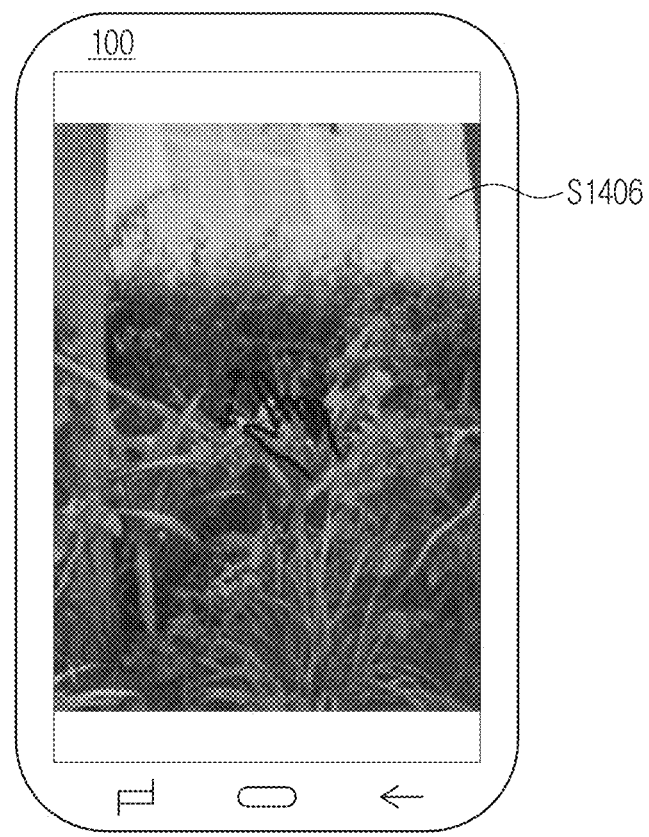
FIG. 14C is an example scenario in which zoom processing is depicted, according to an embodiment of the disclosure.

FIG. 14C is an example scenario (S1406) in which zoom processing is depicted, according to an embodiment of the disclosure.

Referring to FIG. 14C, the user of the electronic device (100) zooms in the gallery. As the zoom factor increases, the receptive field needs to be changed for efficient artifact removal.

Figure 15:
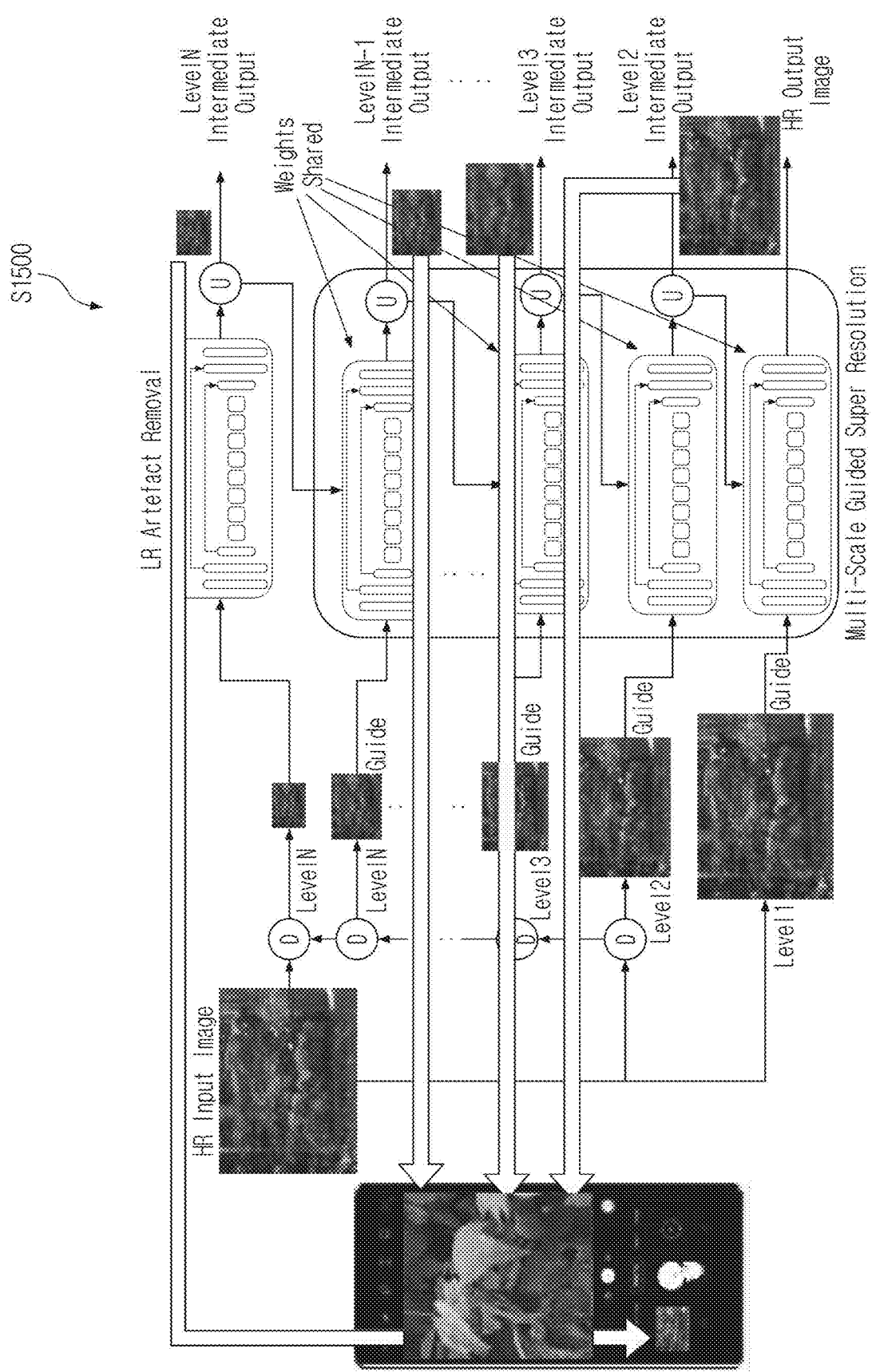
FIG. 15 is an example scenario in which zoom processing is depicted, according to an embodiment of the disclosure.
Figure 16A:
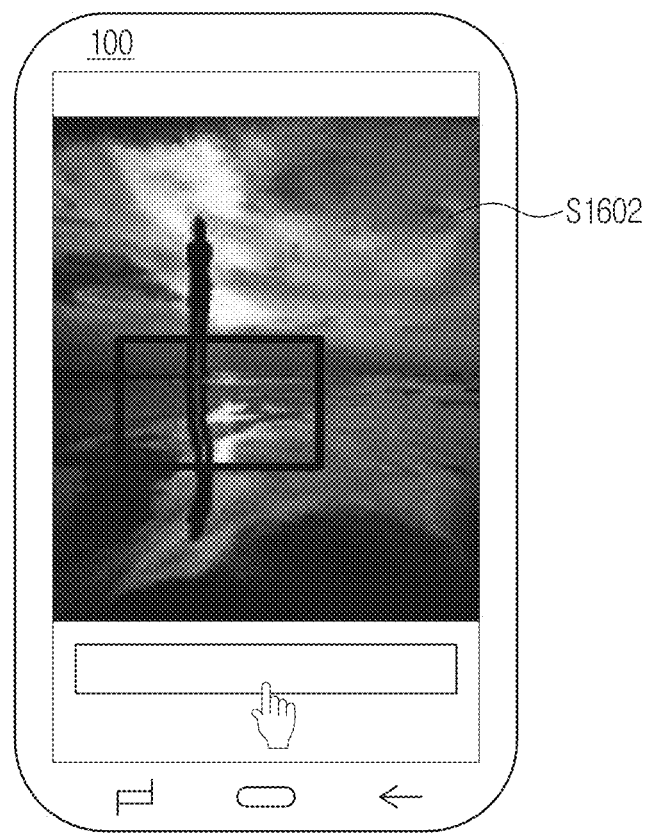
FIGS. 16A, 16B, 16C, and 16D are example scenarios in which desirable artifact control is depicted, according to various embodiments of the disclosure.
Figure 16B:
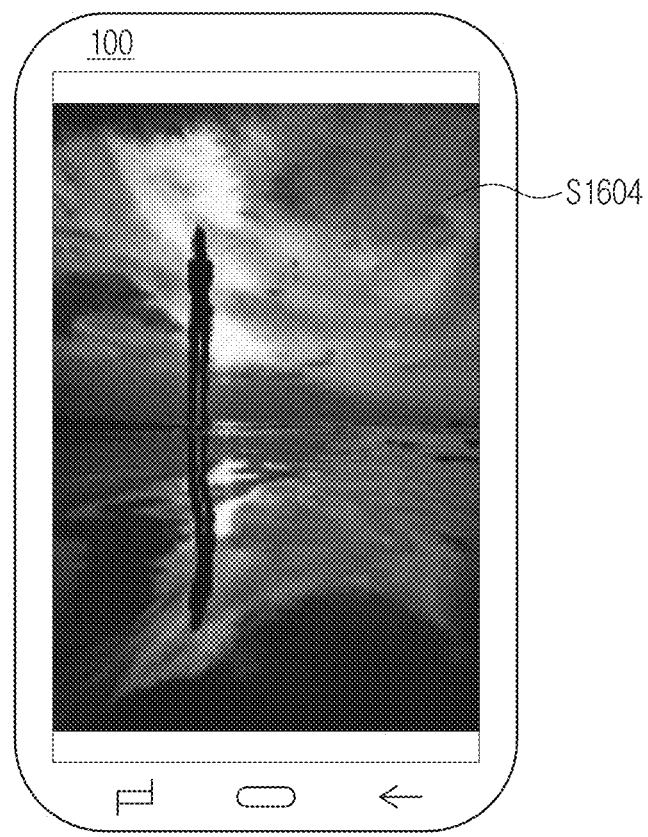
Figure 16C:
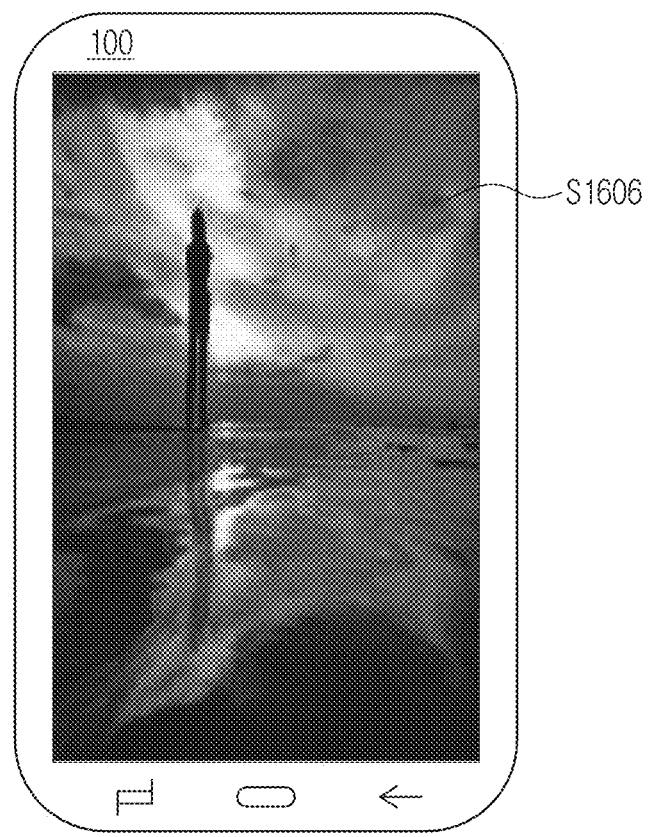
Figure 16D:
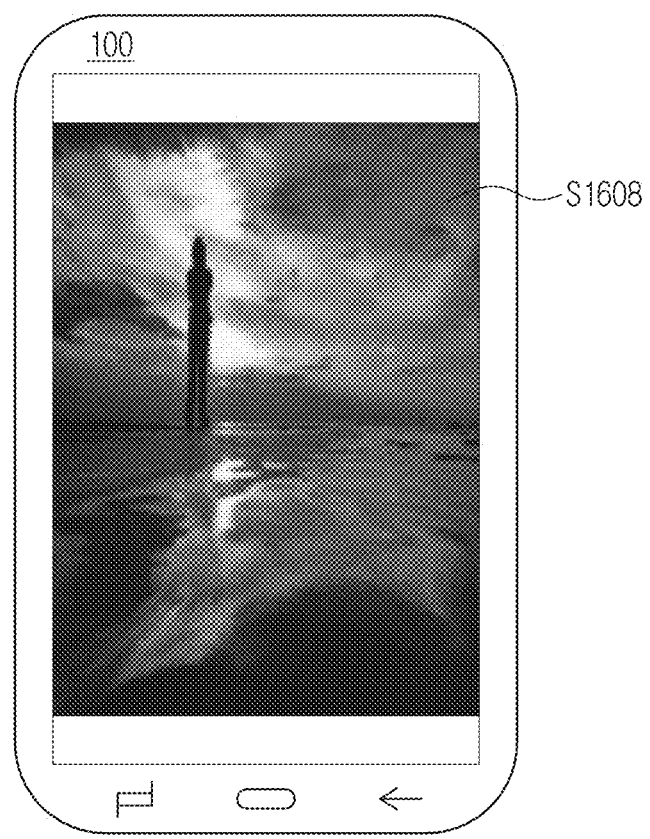

FIG. 15 is an example scenario (S1500) in which zoom processing is depicted, according to an embodiment of the disclosure. During the zoom processing, the artifact removal is already explained in the FIGS. 4, 5A, 5B, and 6 to 10.

FIGS. 16A, 16B, 16C, and 16D are example scenarios S1602, S1604, S1606, and S1608, respectively, in which desirable artifact control is depicted, according to various embodiments of the disclosure. The artifacts such as reflections arising due to objects such as waterbodies, mirrors etc. may be desirable for artistic purposes. If a desirable reflection is detected, the user of the electronic device (100) is given an option to manually control the strength of it. The desirable reflection is detected using an image classifier and the desirable reflection is detected referring to FIG. 16A and the user of the electronic device (100) is given a slider option to control the reflection strength. The reflection strength is controlled by varying number of scales (Scale 2 to Scale 4) referring to FIGS. 16B to 16D.

Figure 17:
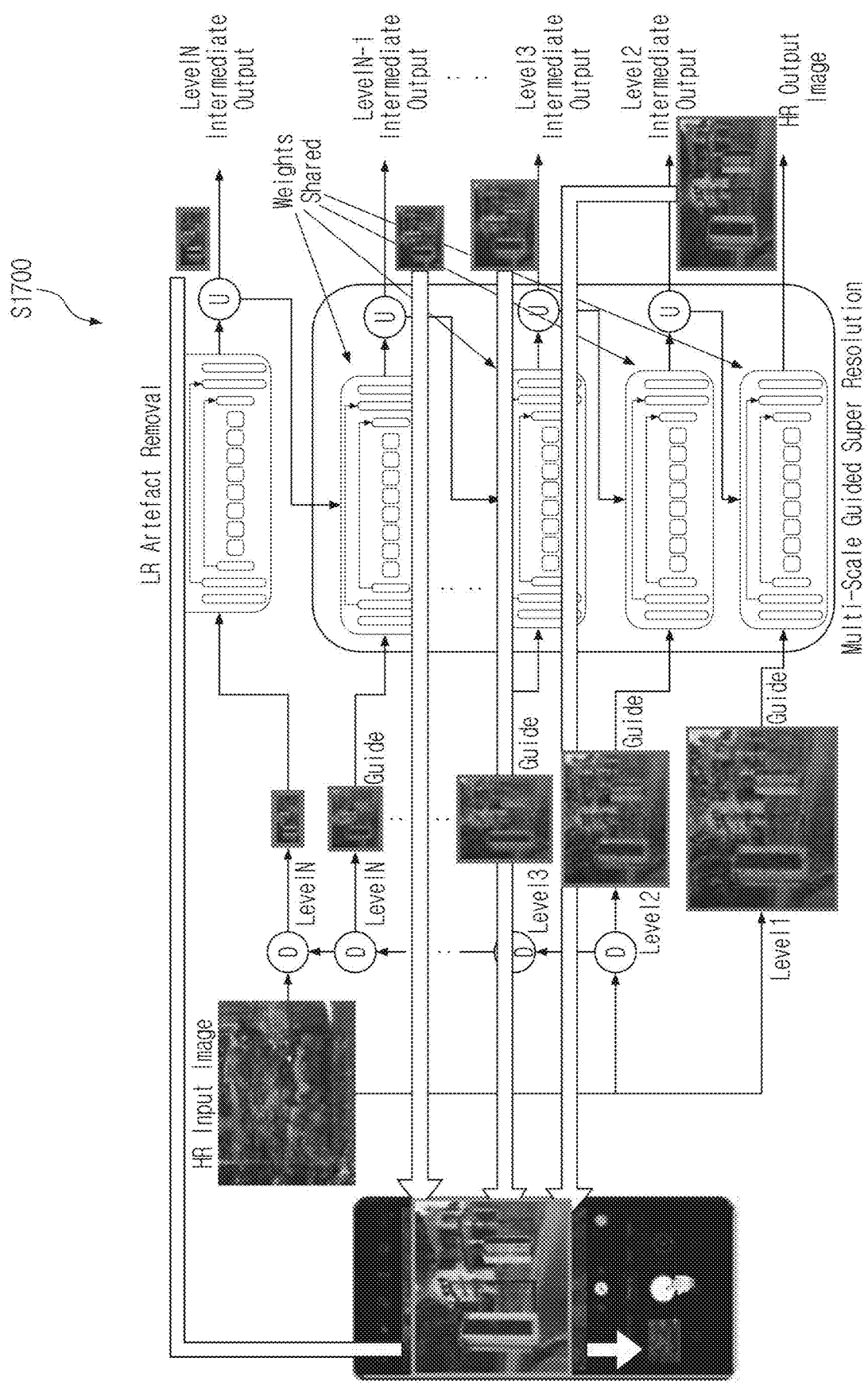
FIG. 17 is example scenario in which temporal scale space video artifact removal is depicted, according to an embodiment of the disclosure.

FIG. 17 is example scenario (S1700) in which temporal scale space video artifact removal is depicted, according to an embodiment of the disclosure. The temporal scale space video artifact removal is already explained in the FIGS. 4, 5A, 5B, and 6 to 10.

Figure 18A:
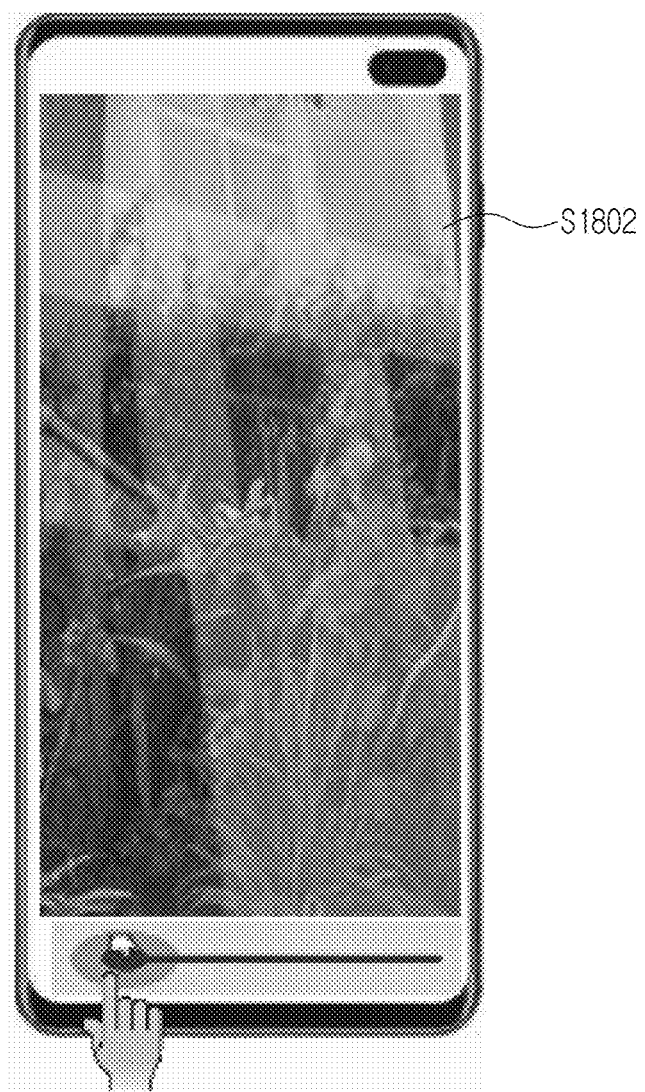
FIGS. 18A, 18B, and 18C are example scenarios in which dynamic control of artifact removal strength is depicted, according to various embodiments of the disclosure.
Figure 18B:
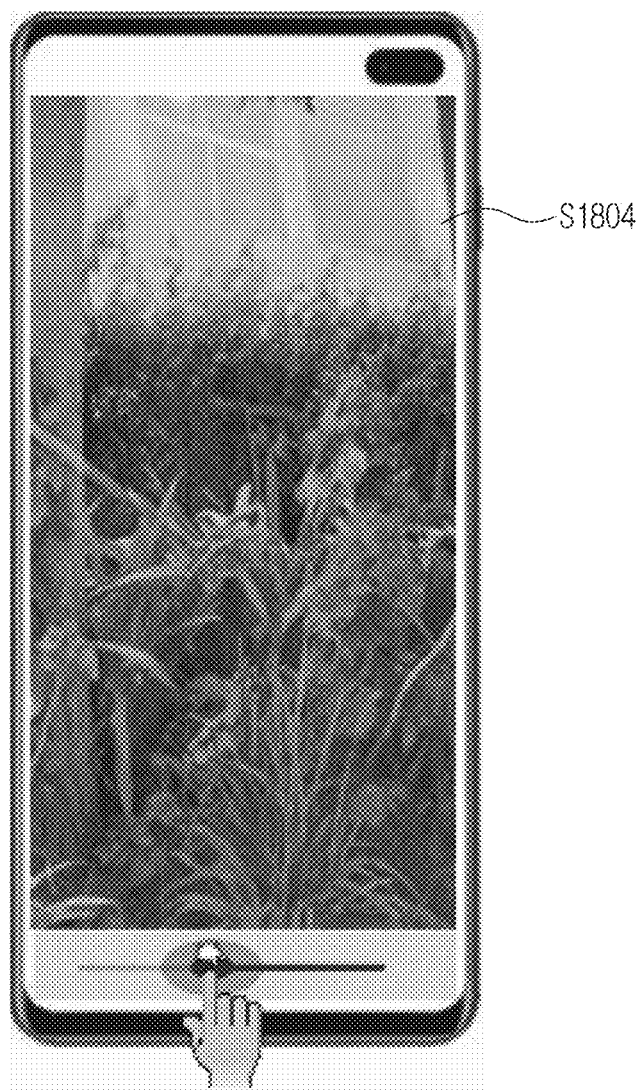
Figure 18C:

FIGS. 18A, 18B, and 18C are example scenarios S1802, S1804, and S1806, respectively, in which dynamic control of artifact removal strength is depicted, according to various embodiments of the disclosure. The user of the electronic device (100) slides to choose the artifact removal strength referring to FIGS. 18A, 18B, and 18C. The artifact removal strength is directly proportional to the number of levels (N). The value of N is set accordingly.

FIGS. 19 to 21, 22A, and 22B illustrate (S1900-S2200b) a comparison of the disclosed artifact removal method (reflection) against conventional methods, according to various embodiments of the disclosure.

Figure 19:
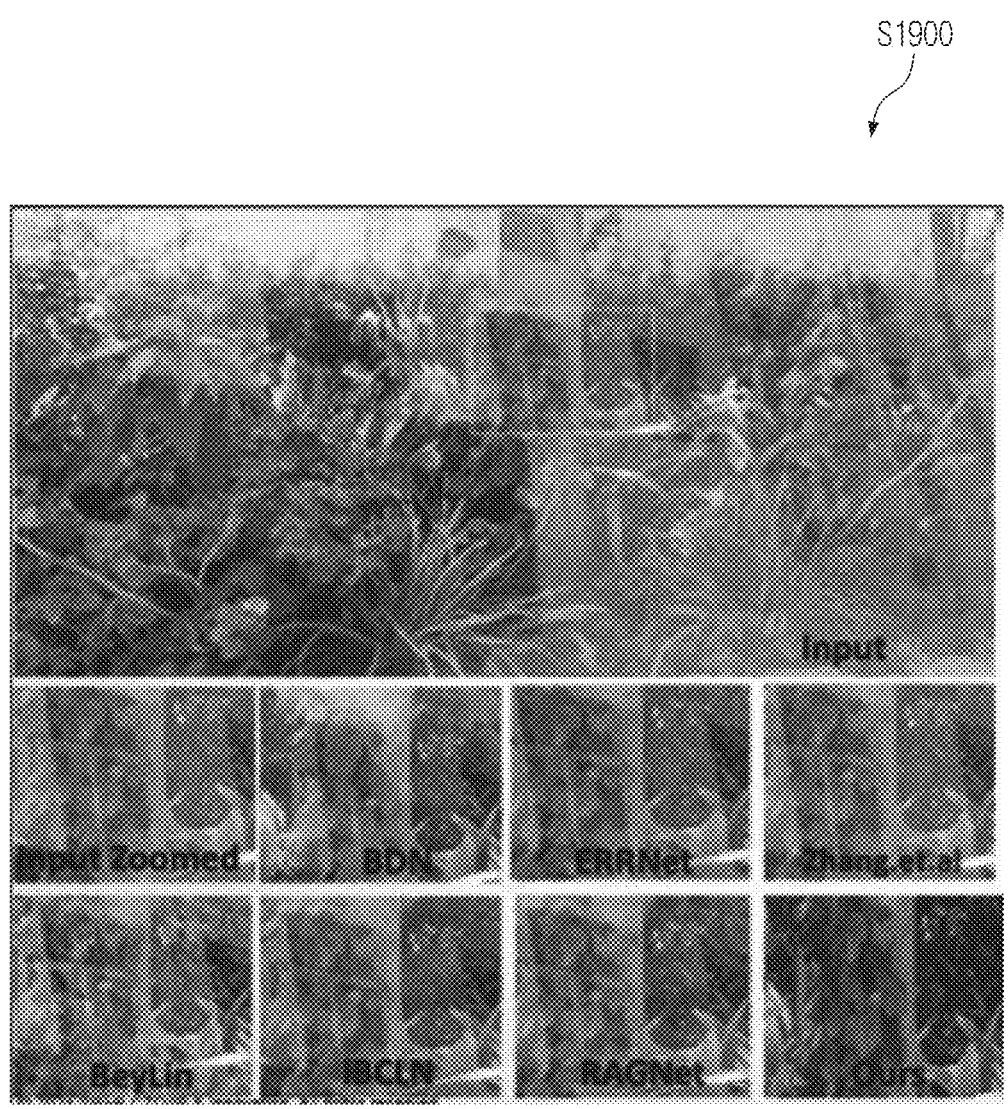
FIGS. 19, 20, 21, 22A, and 22B illustrate a comparison of the disclosed artifact removal method (reflection) against conventional methods, according to various embodiments of the disclosure.

FIG. 19 illustrates a comparison S1900 of the disclosed artifact removal method (reflection) against the related art.

Figure 20:
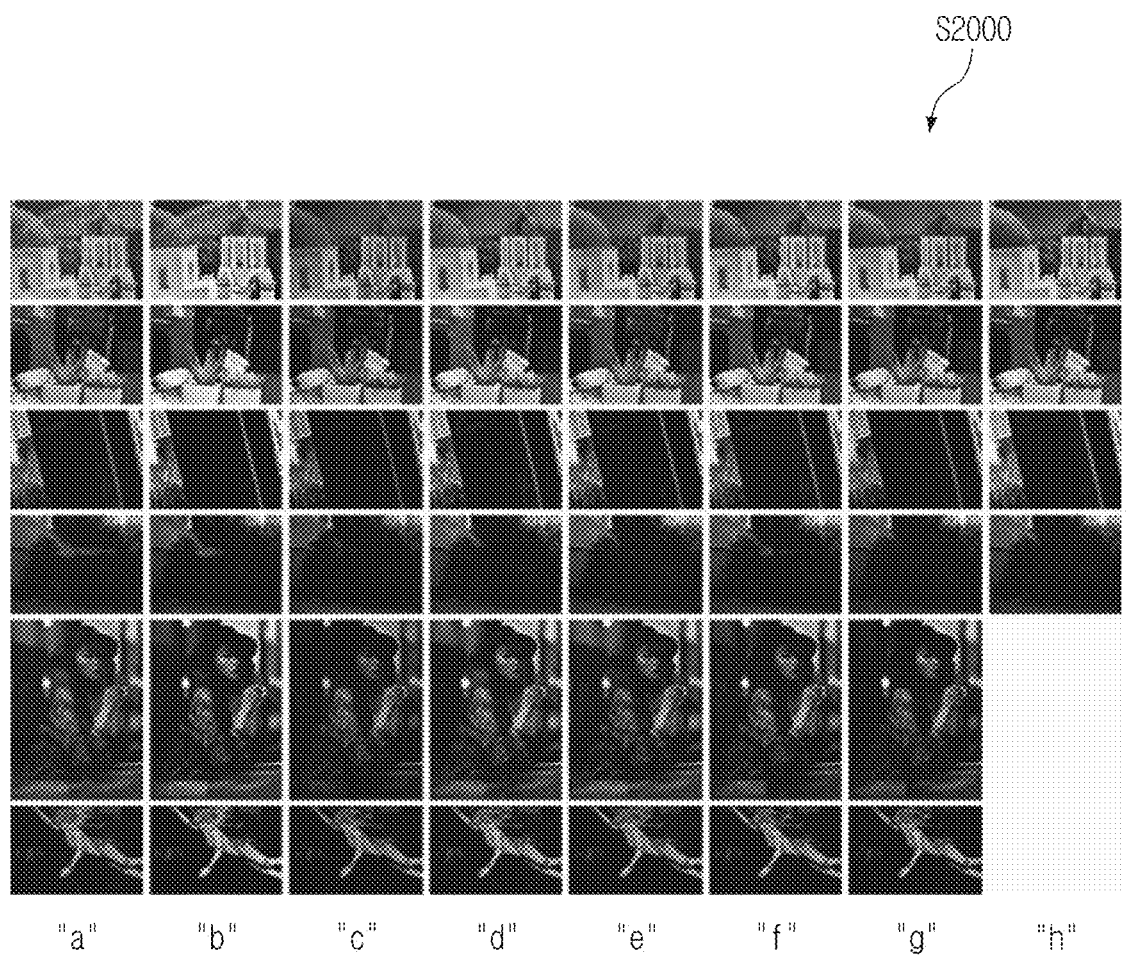

Referring to FIG. 20, in a comparison S2000 column (a) is an input. Columns (b) to (f) are the results from the latest state of the related art methods. Column (g) shows the result from the disclosed method and column (h) contains the corresponding ground truth images.

Figure 21:
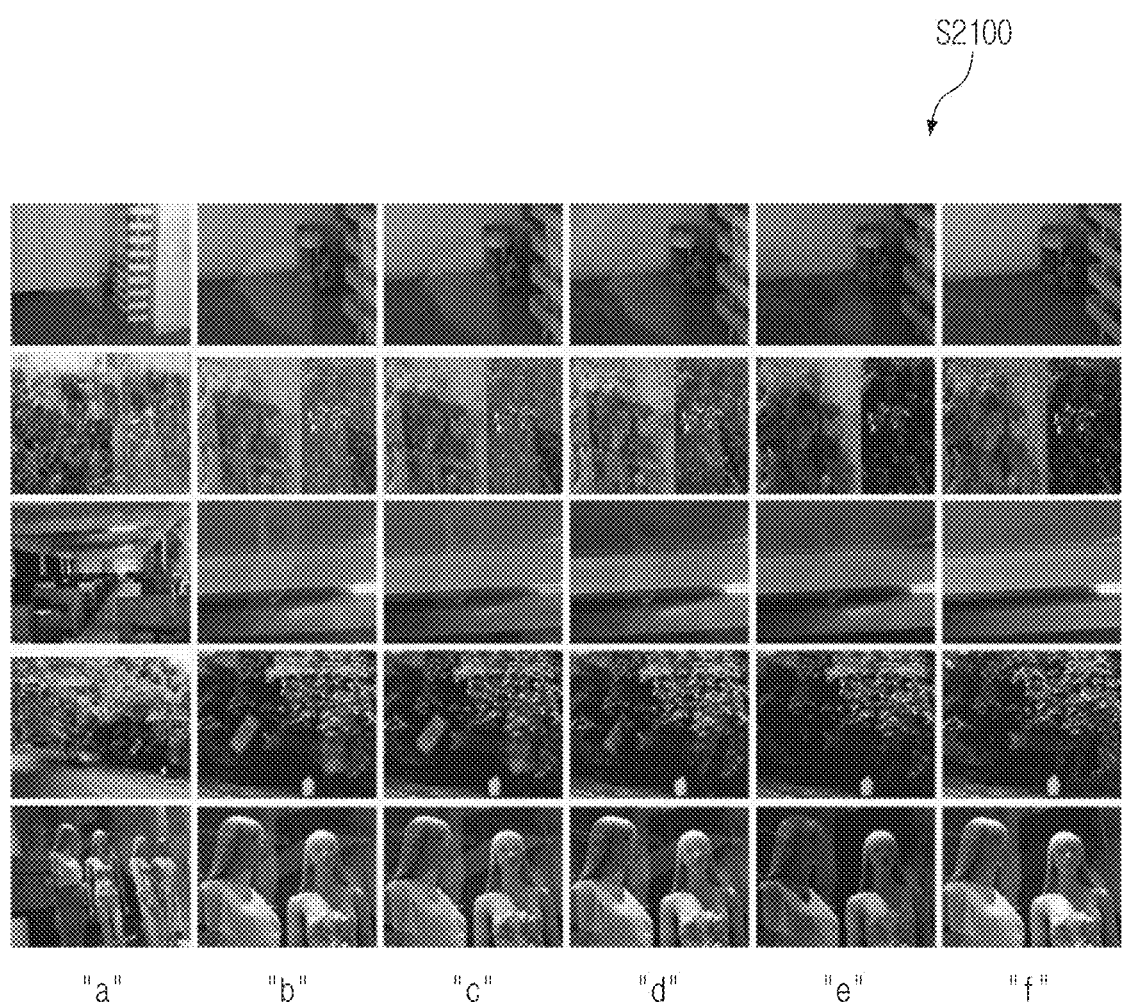

Referring to FIG. 21, in a comparison S2100, for qualitative comparisons on high resolution 12 MP images, columns (a) and (b) contain the input showing the entire high resolution field of view and its zoomed version. Columns (c) and (d) show the results of the best performing state of the related art methods, respectively. Column (e) shows the disclosed method results.

Figure 22A:
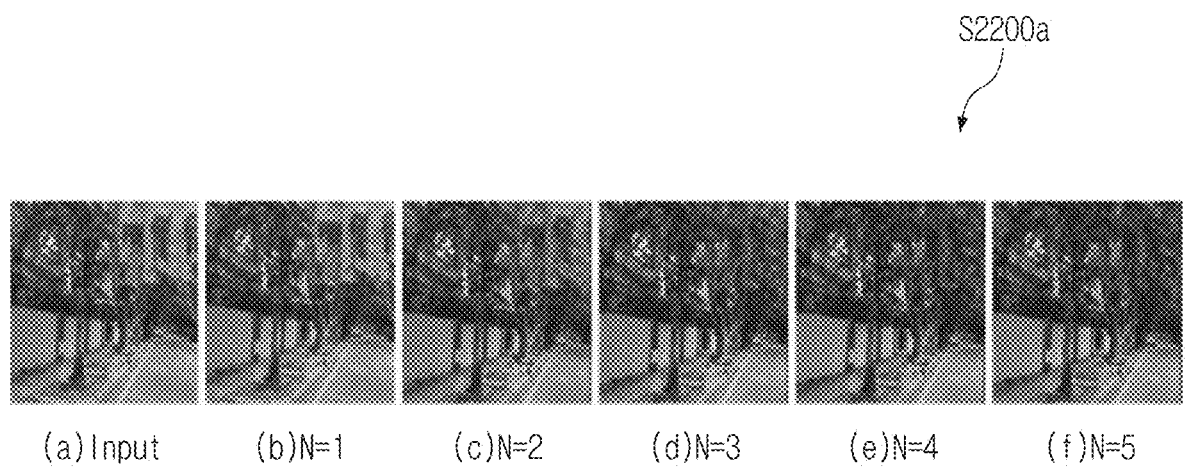

Referring to FIG. 22A, a scale space evaluation S2200a for an ultra-high resolution image of 64 MP is shown. Columns (b)-(f) show the results of varying number of levels in the scale space. The model inference with N=1 comprises of LSSNet only, N=2 comprises of LSSNet followed by HSSNet, N=3 has LSSNet followed by two HSSNets and so on.

Figure 22B:
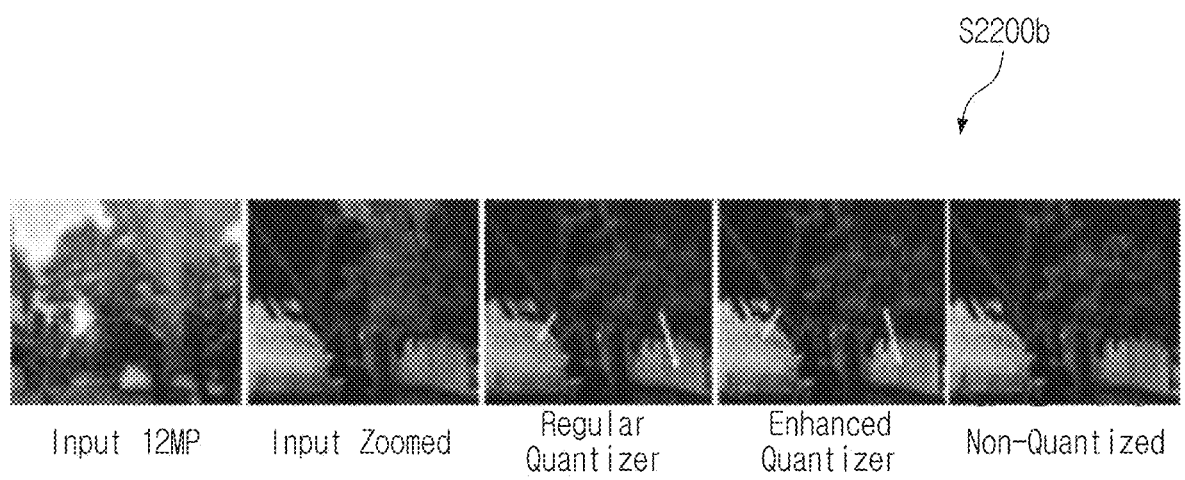

Referring to FIG. 22B, a qualitative evaluation S2200b of quantized model outputs generated on the smart phone is shown. The enhanced quantizer shows image quality comparable to non-quantized output.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for removing an artifact from a high resolution image by an electronic device, the method comprising:
    receiving, by the electronic device, the high resolution image comprising the artifact;
    downscaling, by the electronic device, the high resolution image into a plurality of lower resolution images;
    removing, by the electronic device, the artifact from the plurality of lower resolution images by applying at least one first machine learning model from a plurality of machine learning models on the plurality of lower resolution images; and generating, by the electronic device, a high resolution image without the artifact by applying at least one second machine learning model from the plurality of machine learning models on an output from the at least one first machine learning model, wherein an output from each of the machine learning models comprises a low resolution image without the artifact.

2. The method of claim 1, wherein the downscaling, by the electronic device, of the high resolution image into the plurality of lower resolution images comprises:

determining, by the electronic device, a number of scales of a Low scale sub-network (LSSNet) based on at least one of a predetermined lookup table, a user input, or a number of artifacts to be removed from the high resolution image, and a type of artifacts to be removed from the high resolution image; and downscaling, by the electronic device, the high resolution image into the plurality of lower resolution images based on the number of scales of the LSSNet.

3. The method of claim 2, wherein an iterative Progressive Inference (PI) scheme is used for estimating scales $\{2, \ldots, N\}$ after a first scale $O^1$ is estimated.

4. The method of claim 1, wherein the removing, by the electronic device, of the artifact from the plurality of lower resolution images by applying the at least one first machine learning model on the plurality of lower resolution images comprises:

determining, by the electronic device, a number of artifacts to be removed from the high resolution image;

determining, by the electronic device, a type of each of the artifacts to be removed from the high resolution image;

prioritizing, by the electronic device, the number of artifacts to be removed in a sequence based on the type of each of the artifacts to be removed from the high resolution image;

determining, by the electronic device, a sequence of the at least one first machine learning model of the plurality of machine learning models for removing the artifact from the high resolution image based on the prioritized number of artifacts;

feeding, by the electronic device, each lower resolution image from the plurality of lower resolution images into the at least one first machine learning model based on the determined sequence; and removing, by the electronic device, the artifact from each of the lower resolution images using the at least one first machine learning model.

5. The method of claim 1, wherein the generating, by the electronic device, of the high resolution image without the artifact by applying the at least one second machine learning model from the plurality of machine learning models on an output from the at least one first machine learning model comprises:

obtaining, by the electronic device, the output comprising the low resolution image without the artifact from the at least one machine learning model;

generating, by the electronic device, high resolution output by upscaling the low resolution image without the artifact using a Convolutional Guided Filter (CGF) of at least one second machine learning model from the plurality of machine learning models, wherein the CGF upscales the low resolution image without the artifact using the higher resolution as a guide; and generating, by the electronic device, the high resolution image without the artifact by passing the high resolution output from a High Scale Sub-network (HSSNet).

6. The method of claim 5, wherein the CGF operates at multiple pyramid levels with each pyramid level comprising an identical deep learning model with weights and bias being shared across the pyramid levels.

7. The method of claim 5, wherein both the sub networks LSSNet and HSSNet are trained using a combination of different loss functions comprising pixel and feature losses.

8. The method of claim 1, wherein a receptive field is set dynamically by changing number of scale-space levels.

9. An electronic device for removing an artifact from a high resolution image, wherein the electronic device comprises:

a memory;

a processor; and an artifact removal controller, communicatively connected to the memory and the processor, wherein the artifact removal controller is configured to:

receive the high resolution image comprising the artifact, downscale the high resolution image into a plurality of lower resolution images, remove the artifact from the plurality of lower resolution images by applying at least one first machine learning model from a plurality of machine learning models on the plurality of lower resolution images, and generate a high resolution image without the artifact by applying at least one second machine learning model from the plurality of machine learning models on an output from the at least one first machine learning model, wherein an output from each of the machine learning models comprises a low resolution image without the artifact.

10. The electronic device of claim 9, wherein downscaling the high resolution image into the plurality of lower resolution images comprises:

determining a number of scales of a Low scale sub-network (LSSNet) based on at least one of a predetermined lookup table, a user input, or a number of artifacts to be removed from the high resolution image, and a type of artifacts to be removed from the high resolution image; and downscaling the high resolution image into the plurality of lower resolution images based on the number of scales of the LSSNet.

11. The electronic device of claim 9, wherein removing the artifact from the plurality of lower resolution images by applying the at least one first machine learning model on the plurality of lower resolution images comprises:

determining a number of artifacts to be removed from the high resolution image;

determining a type of each of the artifacts to be removed from the high resolution image;

prioritizing the number of artifacts to be removed in a sequence based on the type of each of the artifacts to be removed from the high resolution image;

determining a sequence of the at least one first machine learning model of the plurality of machine learning models for removing the artifact from the high resolution image based on the prioritized number of artifacts;

feeding each lower resolution image from the plurality of lower resolution images into the at least one first machine learning model based on the determined sequence; and removing the artifact from each of the lower resolution images using the at least one first machine learning model.

12. The electronic device of claim 9, wherein generating the high resolution image without the artifact by applying the at least one second machine learning model from the plurality of machine learning models on an output from the at least one first machine learning model comprises:

obtaining the output comprising the low resolution image without the artifact from the at least one machine learning model;

generating a high resolution output by upscaling the low resolution image without the artifact by using a Convolutional Guided Filter (CGF) of at least one second machine learning model from the plurality of machine learning models, wherein the CGF upscales the low resolution image without the artifact by using the higher resolution as a guide; and generating the high resolution image without the artifact by passing the high resolution output from a High Scale Sub-network (HSSNet).

13. The electronic device of claim 12, wherein the CGF operates at multiple pyramid levels with each pyramid level comprising an identical deep learning model with weights and bias being shared across the pyramid levels.

\* \* \* \* \*